(12) United States Patent
Usuda

(10) Patent No.: US 8,613,490 B2
(45) Date of Patent: Dec. 24, 2013

(54) FLUID EJECTING APPARATUS AND FLUID EJECTING METHOD

(75) Inventor: Hidenori Usuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 13/325,397

(22) Filed: Dec. 14, 2011

(65) Prior Publication Data

US 2012/0147077 A1    Jun. 14, 2012

(30) Foreign Application Priority Data

Dec. 14, 2010 (JP) ................. 2010-278406
Jul. 5, 2011 (JP) ................. 2011-149341

(51) Int. Cl.
*B41J 29/38* (2006.01)

(52) U.S. Cl.
USPC .................................................. 347/12

(58) Field of Classification Search
CPC .................................................. B41J 2/2117
USPC .......................... 347/9–12, 40–43
See application file for complete search history.

(56) References Cited

U.S. PATENT DOCUMENTS

| 7,407,277 | B2 | 8/2008 | Yoneyama | |
|---|---|---|---|---|
| 7,681,973 | B2 * | 3/2010 | Uji et al. | 347/13 |
| 7,963,622 | B2 * | 6/2011 | Ishida | 347/12 |
| 8,480,195 | B2 * | 7/2013 | Fujisawa et al. | 347/9 |

FOREIGN PATENT DOCUMENTS

| JP | 2002-038063 A | 2/2002 |
|---|---|---|
| JP | 2003-285422 A | 10/2003 |
| WO | 2005-105452 A1 | 11/2005 |

* cited by examiner

*Primary Examiner* — An Do
(74) *Attorney, Agent, or Firm* — Nutter McClennen & Fish LLP; John J. Penny, V

(57) ABSTRACT

A fluid ejecting apparatus repeats an ejecting operation which ejects a fluid from nozzles while a first nozzle row and a second nozzle row move in a movement direction with respect to a medium and a relative movement operation in which the first nozzle row, the second nozzle row and the medium relatively move to the nozzle row direction, and repeatedly performs the ejecting operation so as to include the ejecting operation which does not perform a control which changes the movement distance in the movement direction of the first nozzle row and the second nozzle row according to a position of an end in the movement direction of the image when a main image and a background image are formed to be overlapped on the medium at different ejecting operations.

8 Claims, 23 Drawing Sheets

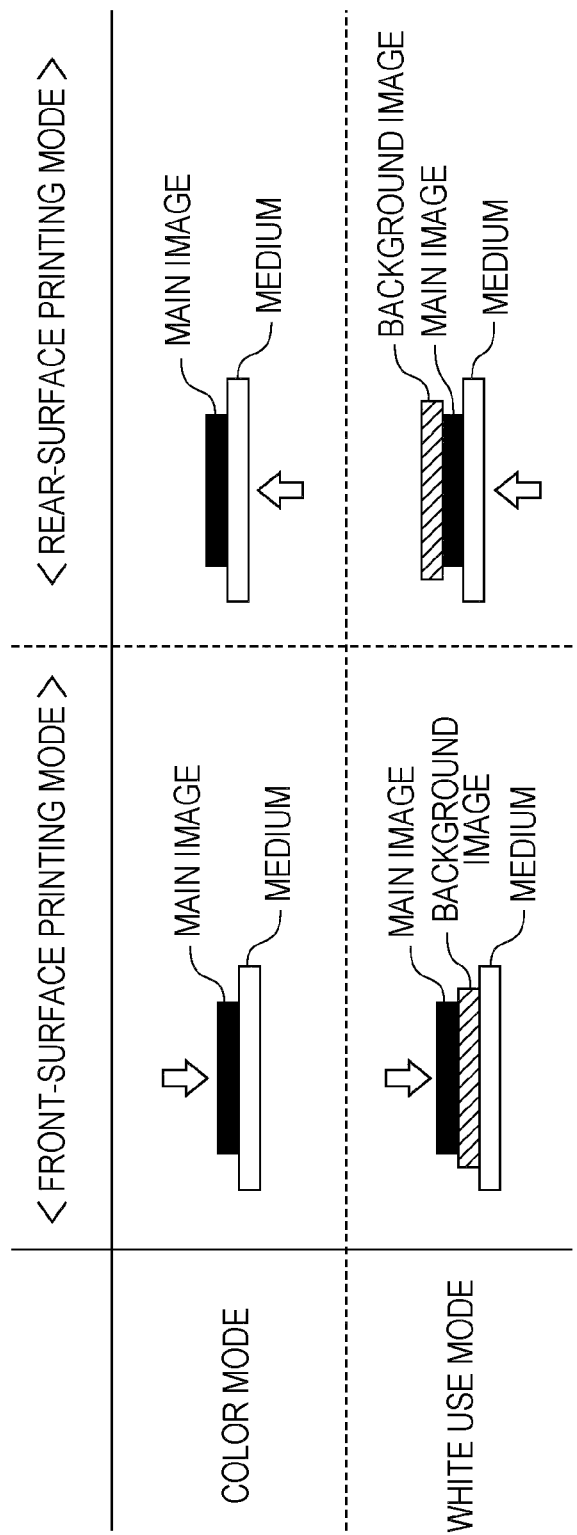

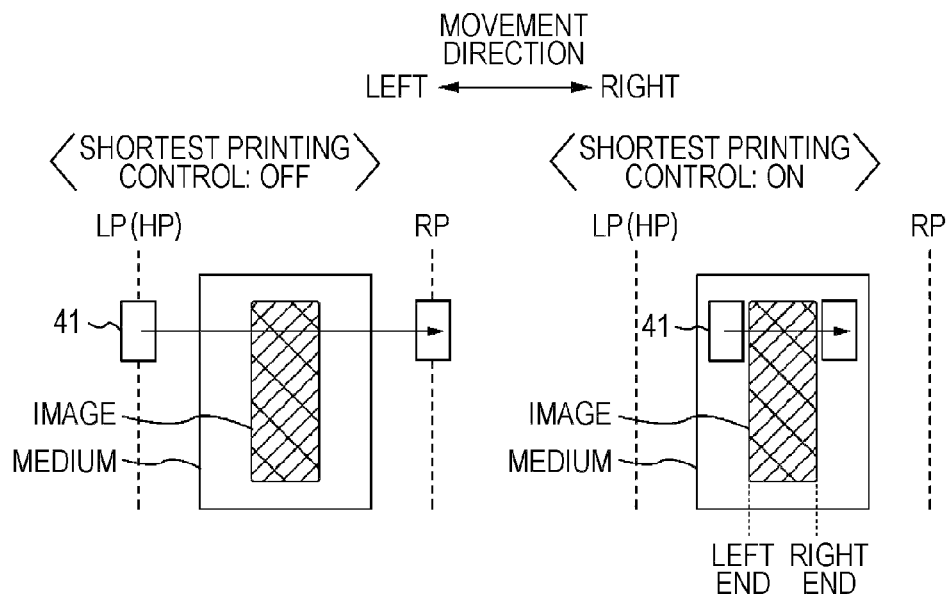
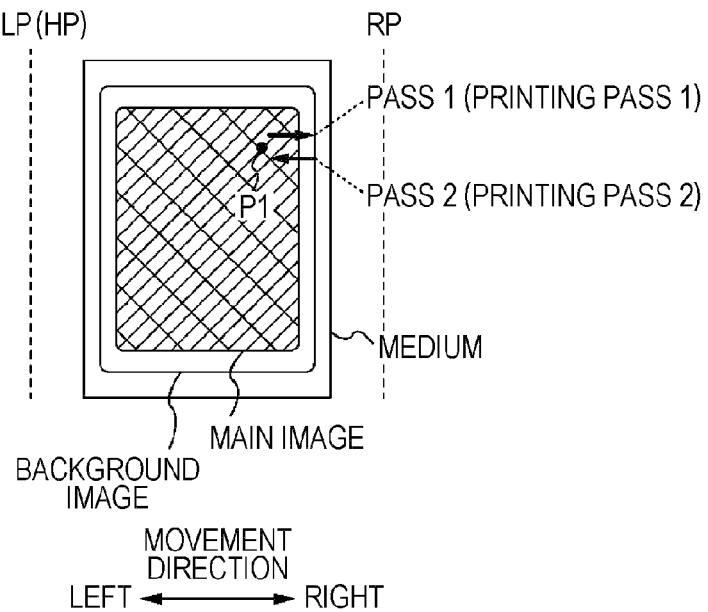

< SHORTEST PRINTING CONTROL: OFF >
< WHITE USE MODE / FRONT-SURFACE PRINTING MODE >
< BIDIRECTIONAL PRINTING >

FIG. 17

|  | < COLOR MODE > | < WHITE USE MODE > |  |
|---|---|---|---|
| EIGHTH EMBODIMENT | SHORTEST PRINTING CONTROL IS PERFORMED | SHORTEST PRINTING CONTROL IS NOT PERFORMED | |
| NINTH EMBODIMENT | SHORTEST PRINTING CONTROL IS PERFORMED | < FRONT-SURFACE PRINTING MODE > SHORTEST PRINTING CONTROL IS NOT PERFORMED | < REAR-SURFACE PRINTING MODE > Co: PERFORMED W: NOT PERFORMED |

FIG. 18A
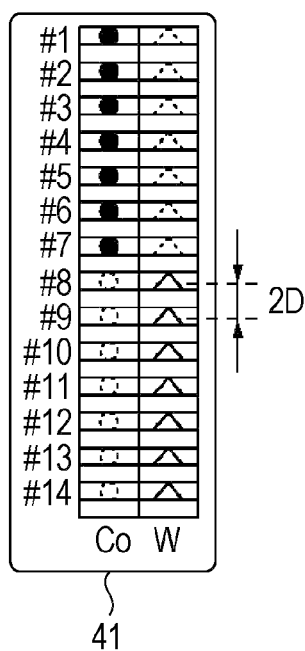
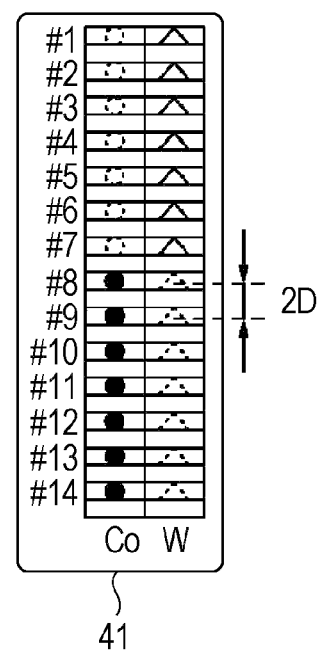

FLUID EJECTING APPARATUS AND FLUID EJECTING METHOD

Priority is claimed under U.S.C. §119 to Japanese Application No. 2010-278406 filed on Dec. 14, 2010 and No. 2011-149341 filed on Jul. 5, 2011 which are hereby incorporated by reference in its entirety.

BACKGROUND

1. Technical Field

The present invention relates to a fluid ejecting apparatus and a fluid ejecting method.

2. Related Art

As one fluid ejecting apparatus, there is an ink jet printer (hereinafter, referred to as a "printer") which ejects ink (fluid) from a head and prints an image on a medium. In printers, there is a printer that prints a two-dimensional image on a medium by repeatedly performing an operation which ejects ink while a head moves in the movement direction and an operation which transports the medium with respect to the head in a transporting direction crossing to the movement direction.

Moreover, in printers, there is a printer which uses a white ink other than color inks including a cyan ink, a magenta ink, a yellow ink (for example, refer to JP-A-2002-38063). In the printer, by printing a background image through the white ink and a main image through the color inks so as to be overlapped, an image having an excellent chromogenic property can be printed without being influenced by the ground color of the medium.

In addition, there is a printer performing a control which changes a movement distance of a head according to a position of an end (edge) in a movement direction of an image. In the printer, when a small image is printed, the movement distance of the head becomes short, and the printing time can be shortened.

However, in a case where the background image and the main image are printed so as to be overlapped, if the movement distance of the head is short, a time interval in which the background image and the main image are printed so as to be overlapped becomes short. Therefore, bleeding or color mixture on the image occurs, and quality of the image is deteriorated.

SUMMARY

An advantage of some aspects of the invention is to suppress deterioration in quality of an image.

According to an aspect of the invention, there is provided a fluid ejecting apparatus including a first nozzle row in which nozzles ejecting a first fluid are aligned in a predetermined direction, a second nozzle row in which nozzles ejecting a second fluid are aligned in the predetermined direction, and a control portion that causes repeatedly performing of an ejecting operation which ejects the fluid from the nozzles while the first nozzle row and the second nozzle row move in a movement direction crossing the predetermined direction with respect to a medium, and a transporting operation which relatively moves the first nozzle row and the second nozzle row and the medium in the predetermined direction, in which the control portion which does not perform a control which changes the movement distance in the movement direction of the first nozzle row and the second nozzle row according to a position of an end in the movement direction of the image when a main image formed by the first fluid and a background image formed by the second fluid are formed so as to be overlapped on the medium at different ejecting operations.

Other characteristics of the invention will be obvious according to the description and the accompanying drawings.

BRIEF DESCRIPTION OF THE DRAWINGS

The invention will be described with reference to the accompanying drawings, wherein like numbers reference like elements.

FIG. 3 is a diagram showing printing modes which are included by the printer.

FIG. 5 is a diagram explaining the shortest printing control.

FIG. 6 is a diagram explaining a printing method of a comparative example.

FIG. 17 is an explanation diagram of a ninth embodiment.

FIG. 18A is an explanation diagram of use nozzles in a printing method of a tenth embodiment.

DESCRIPTION OF EXEMPLARY EMBODIMENTS

Overview

Figure 1:
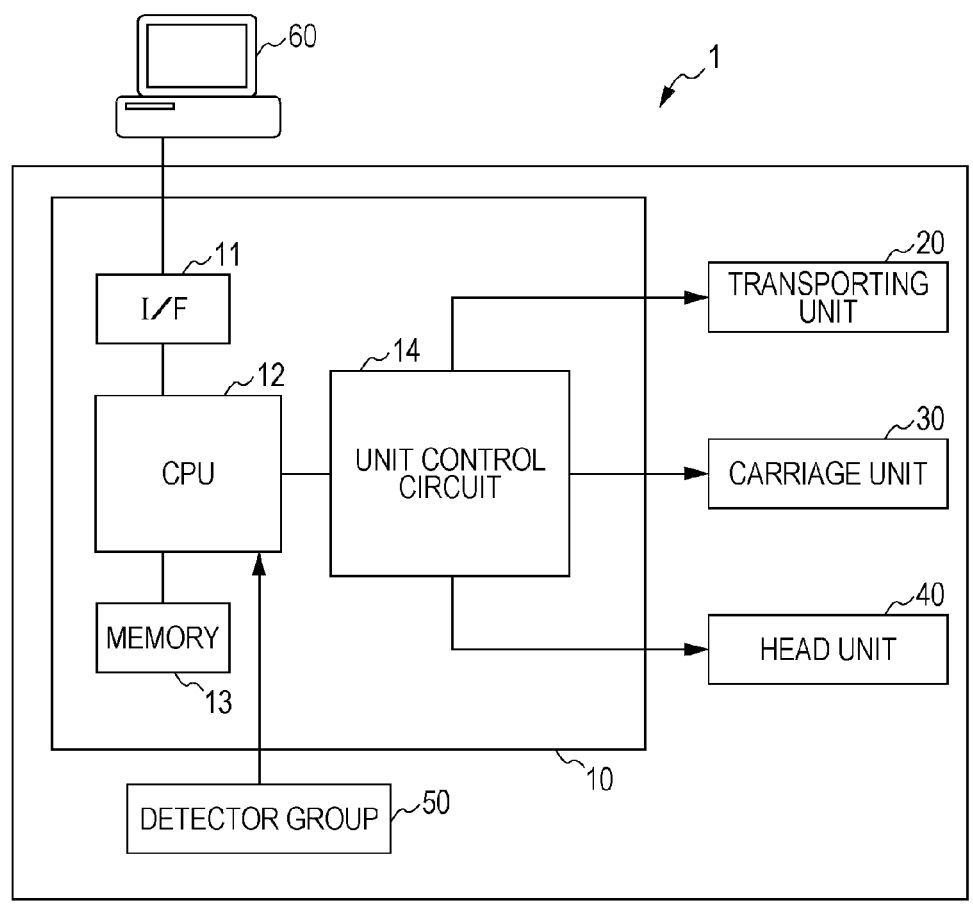
FIG. 1 is a block diagram showing an overall configuration of a printer.

According to the description of the specification and the accompanying drawings, at least the following will be obvious.

According to an aspect of the invention, there is provided a fluid ejecting apparatus including a first nozzle row in which nozzles ejecting a first fluid are aligned in a predetermined direction, a second nozzle row in which nozzles ejecting a second fluid are aligned in the predetermined direction, and a control portion that causes repeatedly performing of an ejecting operation which ejects the fluid from the nozzles while the first nozzle row and the second nozzle row move in a movement direction crossing the predetermined direction with respect to a medium, and a transporting operation which relatively moves the first nozzle row and the second nozzle row and the medium in the predetermined direction, in which the control portion does not perform a control which changes the movement distance in the movement direction of the first nozzle row and the second nozzle row according to a position of an end in the movement direction of the image when a main image formed by the first fluid and a background image formed by the second fluid are formed so as to be overlapped on the medium at different ejecting operations.

According to the aspect of the invention, bleeding or color mixture of the image can be prevented even when the main image and the background image are formed so as to be overlapped, and deterioration in quality of the image can be suppressed.

In the fluid ejecting apparatus, the control portion may perform a control which changes the movement distance in the movement direction of the first nozzle row and the second nozzle row in the movement direction according to a position of an end in the movement direction of the image when the main image is formed on the medium so as not to be overlapped with the background image.

According to the fluid ejection apparatus, an image forming time can be shortened.

In the fluid ejecting apparatus, when the main image and the background image are formed so as to be overlapped, the control portion may cause the fluid to be ejected from the nozzles when the first nozzle row and the second nozzle row move to the same side as the movement direction of the former ejecting operation in a case where a distance, which is from an end of an image of a side in which the first nozzle row and the second nozzle row are supposed to be moved in the movement direction to the end of the supposed side in the movement direction of the medium when forming an image to be formed in advance with respect to a predetermined region of the medium, is less than a threshold value, and the control portion may cause the fluid to be ejected when the first nozzle row and the second nozzle row move to the side opposite the movement direction of the former ejecting operation in a case where the distance is the threshold value or more.

According to the fluid ejecting apparatus, the image forming time can be shortened while suppressing deterioration in quality of the image.

In the fluid ejecting apparatus, when the main image and the background image are formed so as to be overlapped, in a case where a distance, which is from an end of an one side in the movement direction of an image formed in advance with respect to a predetermined region of the medium to the end of the one side in the movement direction of the medium when performing a certain ejecting operation in which the first nozzle row and the second nozzle row move to the one side in the movement direction, is less than a threshold value, the control portion may cause fluid to be ejected from the nozzles when the first nozzle row and the second nozzle row move to the one side in the movement direction at the time of the next ejection operation of a certain ejection operation, and the control portion may cause the fluid to be ejected from the nozzles when the first nozzle row and the second nozzle row move to other side in the movement direction at the time of the next ejection operation of a certain ejection operation in a case where the distance is the threshold value or more.

According to the fluid ejecting apparatus, the image forming time can be shortened while suppressing deterioration in quality of the image.

In the fluid ejecting apparatus, when the main image and the background image are formed so as to be overlapped, in a case where a distance, which is from an end of an one side in the movement direction of a region overlapping an image formed later and an image formed in advance with respect to a predetermined region of the medium to the end of the one side in the movement direction of the medium when performing a certain ejecting operation in which the first nozzle row and the second nozzle row move to the one side in the movement direction, is less than a threshold value, the control portion may cause fluid to be ejected from the nozzles when the first nozzle row and the second nozzle row move to the one side in the movement direction at the time of the next ejection operation of a certain ejection operation, and the control portion may cause the fluid to be ejected from the nozzles when the first nozzle row and the second nozzle row move to other side in the movement direction at the time of the next ejection operation of a certain ejection operation in a case where the distance is the threshold value or more.

According to the fluid ejecting apparatus, the image forming time can be shortened while suppressing deterioration in quality of the image.

In the fluid ejecting apparatus, when the main image and the background image are formed so as to be overlapped, the control portion may perform a control which ejects the fluid from the nozzles when the first nozzle row and the second nozzle row move both directions in the movement direction, and a time interval in a case where a distance, which is from an end of an image of a side to which the first nozzle row and the second nozzle row move in the movement direction to an end of a side to which the medium moves in the movement direction when forming an image to be formed in advance with respect to a predetermined region of the medium, is less than a predetermined value may be longer than a time interval in a case where the distance is the threshold or more.

According to the fluid ejecting apparatus, the image forming time can be shortened while suppressing deterioration in quality of the image.

In the fluid ejecting apparatus, the control portion may perform control to eject the fluid from the nozzles only when the first nozzle row and the second nozzle row move to one side in the movement direction when the main image and the background image are formed so as to be overlapped.

According to the fluid ejecting apparatus, bleeding or color mixture of the image can be reliably prevented when the main image and the background image are formed so as to be overlapped.

According to another aspect of the invention, there is provided a fluid ejecting method including repeating performing an ejection operation in which a first nozzle row in which nozzles ejecting a first fluid are aligned in a predetermined direction and a second nozzle row in which nozzles ejecting a second fluid are aligned in the predetermined direction eject the fluid from the nozzles while moving in a movement direction crossing the predetermined direction and performing a relative movement operation in which the first nozzle row and the second nozzle row and the medium relatively move in the predetermined direction, and repeatedly performing the ejecting operation so as to include the ejecting operation which does not change the movement distance in the movement direction of the first nozzle row and the second nozzle row according to a position of an end in the movement direction of the image when a main image formed by the first fluid and a background image formed by the second fluid are formed so as to be overlapped on the medium at different ejecting operations.

According to another aspect of the invention, bleeding or color mixture of the image can be prevented even when the main image and the background image are formed so as to be overlapped, and deterioration in quality of the image can be suppressed.

Printing System

Hereinafter, a printing system in which an ink jet printer (hereinafter, referred to as a "printer") and a computer are connected to each other will be described as an example of an embodiment.

Figure 2A:
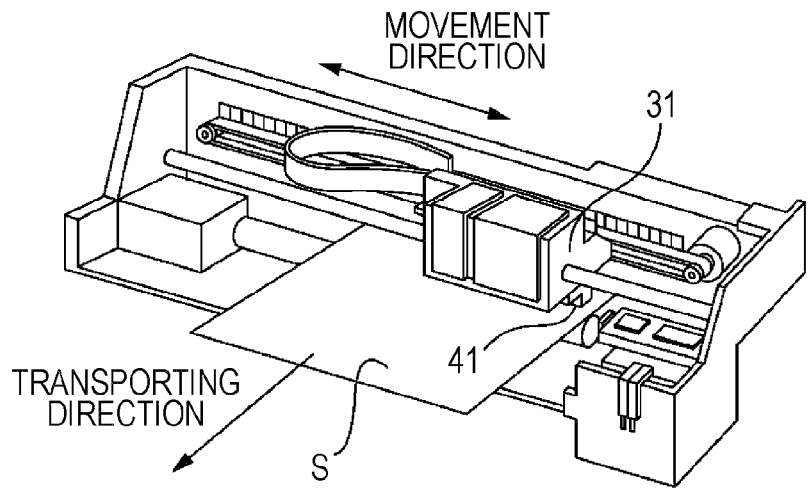
FIG. 2A is a perspective diagram showing the printer.
Figure 2B:
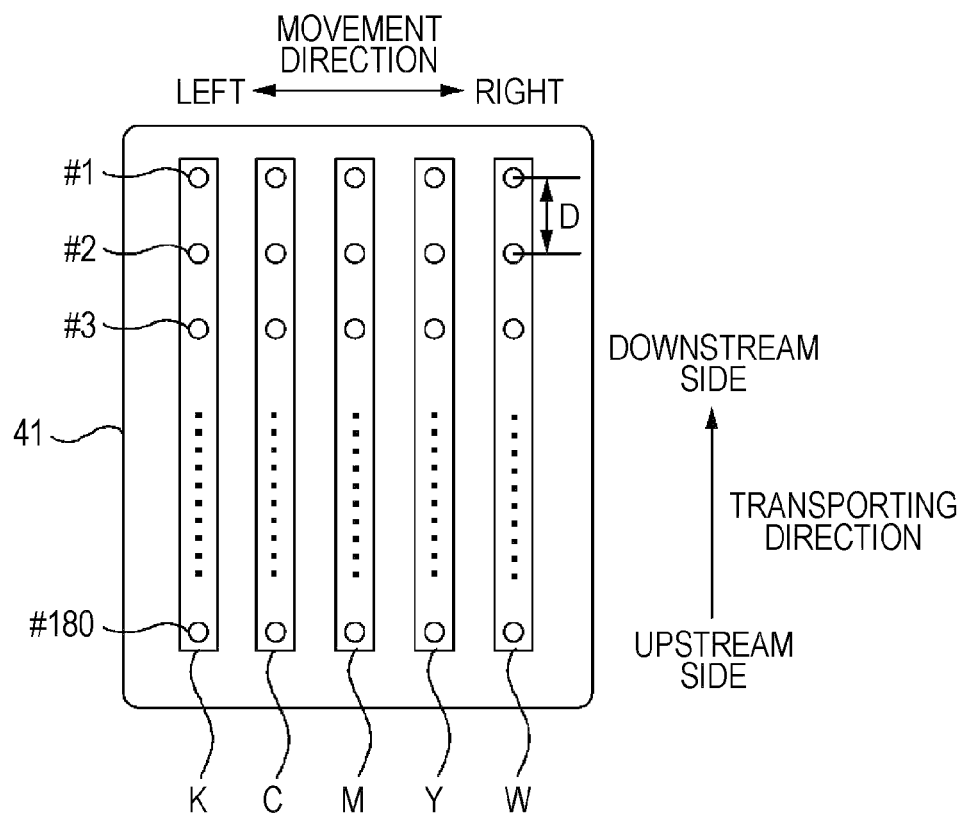
FIG. 2B is a diagram showing an arrangement of nozzles which are installed on a lower surface of a head.

FIG. 1 is a block diagram showing an overall configuration of a printer 1. FIG. 2A is a perspective diagram showing the printer 1, and FIG. 2B is a diagram showing an arrangement of nozzles which are installed on a lower surface of a head 41. In addition, FIG. 2B is a diagram virtually showing the nozzles as seen from an upper surface of a head 41. A computer 60 is connected so as to be communicated with the printer 1, and outputs image data for printing the image on the printer 1 to the printer 1. In addition, a program (printer driver) for converting image data which is output from an application program to printing data is installed on the computer 60. The printer driver is stored on recording media such as a CD-ROM, or can be downloaded onto the computer through the Internet.

A controller 10 is a control unit for performing a control of the printer 1. An interface portion 11 sends and receives data between the computer 60 and the printer 1. A CPU 12 is a calculation processing unit for performing a control of the entire printer 1. A memory 13 secures an area which stores a program of the CPU 12, or an operation area, and the like. The CPU 12 controls each unit by a unit control circuit 14. In addition, a detector group 50 observes a condition in the printer 1, and the controller 10 controls each unit based on the detected result.

A transporting unit 20 feeds a medium S to a printable position, and transports the medium S by a predetermined transporting amount in a transporting direction when printing.

A carriage unit 30 moves the head 41 in a movement direction crossing the transporting direction, and includes a carriage 31.

A head unit 40 ejects ink on the medium S, and includes the head 41. The head 41 moves in the movement direction by the carriage 31. A plurality of nozzles which is an ink ejecting portion is installed on the lower surface of the head 41, and an ink chamber (not shown) in which ink is charged is installed on each nozzle.

As shown in FIG. 2B, five nozzle rows in which 180 nozzles are aligned in the transporting direction by a predetermined interval D (for example, 180 dpi) are formed on the lower surface of the head 41. From the left side in the movement direction, a black nozzle row K which ejects a black ink, a cyan nozzle row C which ejects a cyan ink, a magenta nozzle row M which ejects a magenta ink, a yellow nozzle row Y which ejects a yellow ink, and a white nozzle row W which ejects a white ink are aligned in order. In addition, the black nozzle row K, the cyan nozzle row C, the magenta nozzle row M, and the yellow nozzle row Y correspond to a "first nozzle row", and the white nozzle row W corresponds to a "second nozzle row". Moreover, with respect to 180 nozzles which are included in each nozzle row has, numbers are denoted in order with smaller number from the nozzle of the downstream side in the transporting direction (#1 to #180).

In the printer 1, the controller 10 causes repeatedly performing of an ejecting operation which ejects ink from the nozzles while the head 41 moves in the movement direction with respect to the medium and a transporting operation which transports the medium in the transporting direction with respect to the head. Thereby, a dot can be formed by a later ejecting operation at a position on the medium which is different to a dot position formed by a former ejecting operation, and a two-dimensional image can be printed on the medium.

For explanation below, an operation in which the head 41 moves in the movement direction is referred to as a "pass", a pass (ejecting operation) which ejects ink from the nozzles when the head 41 moves in the movement direction is referred to as a "printing pass", and a pass in which ink is not ejected from the nozzles when the head 41 moves in the movement direction is referred to as a "return pass". The passes from a first pass with respect to one page (one sheet medium) are referred to as "pass 1, pass 2, pass 3, . . . " in order, and the printing passes from a first printing pass with respect to one page are referred to as "printing pass 1, printing pass 2, printing pass 3, . . . " in order.

Printing Mode

FIG. 3 is a diagram showing printing modes which are included in the printer 1 of the present embodiment. The printer 1 includes a "color mode" which prints only main image on the medium through inks of four colors (YMCK, corresponding to a first fluid), and a "white use mode" which prints on the medium so as to overlap a background image on the main image through the white ink (corresponding to a second fluid). Due to the fact that the main image and the background image are printed so as to be overlapped like in the white use mode, particularly, image having an excellent chromogenic property can be printed when the medium is not white. In addition, when the medium is transparent, it is possible to prevent the side opposite to the printed material from being transparent due to the fact that the main image and the background image are printed so as to be overlapped.

Moreover, the printer 1 includes a "front-surface printing mode" which prints so as to view the main image from the printing surface side, and a "rear-surface printing mode" which prints so as to view the main image via the medium. Therefore, when the white use mode and the front-surface printing mode are set, the background image is printed on the medium in advance, and the main image is printed so as to be overlapped on the background image. On the other hand, when the white use mode and the rear-surface printing mode are set, the main image is printed on the medium in advance, and the background image is printed so as to be overlapped on the main image. In addition, when the medium is transparent, it is possible to perform the rear-surface printing mode.

For explanation below, in the main image and the background image, the image which is printed on a predetermined region of the medium in advance is referred to as a "lower layer image (former image)", and the image which is later printed on a predetermined region of the medium is referred to as an "upper layer image (later image)".

Printing Method in White Use Mode

Figure 4A:
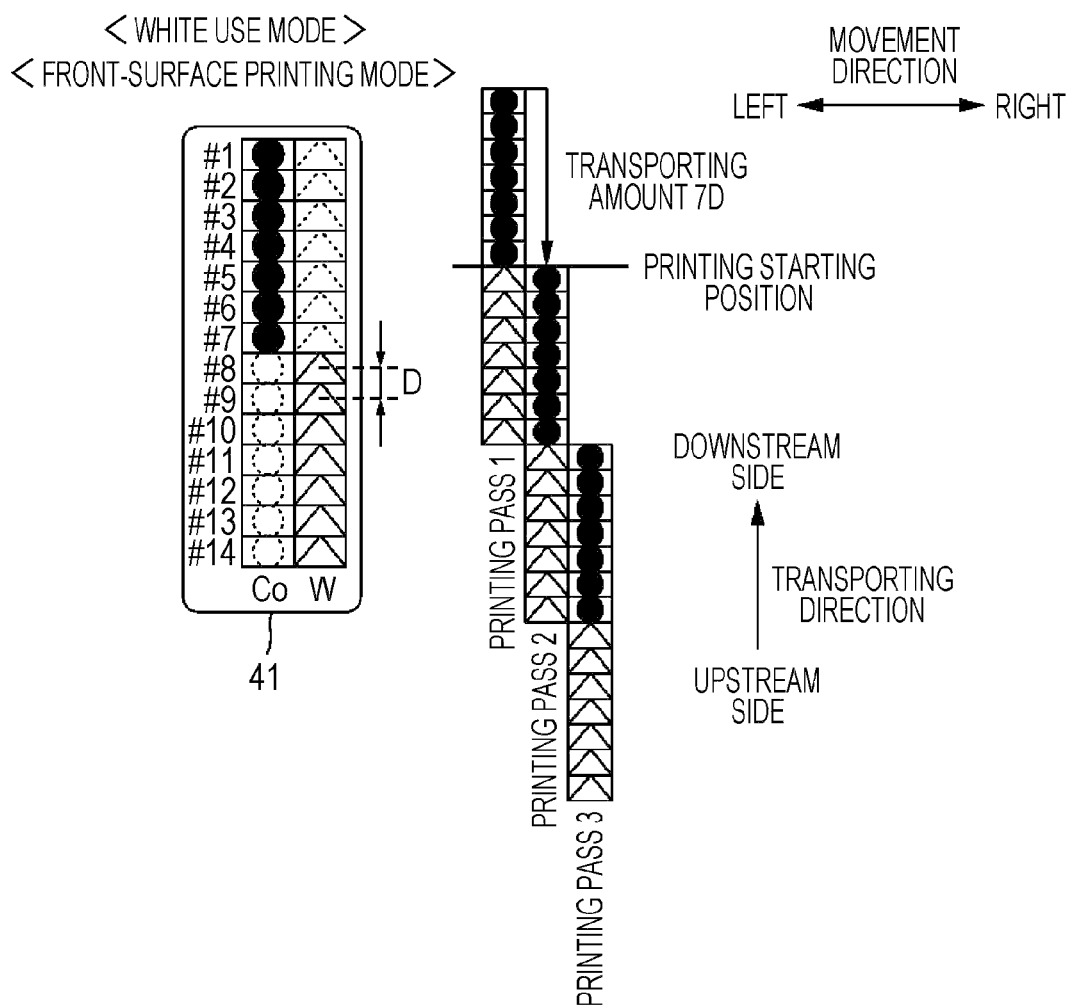
FIG. 4A is a diagram explaining a printing method of a white use mode and a front-surface printing mode.
Figure 4B:
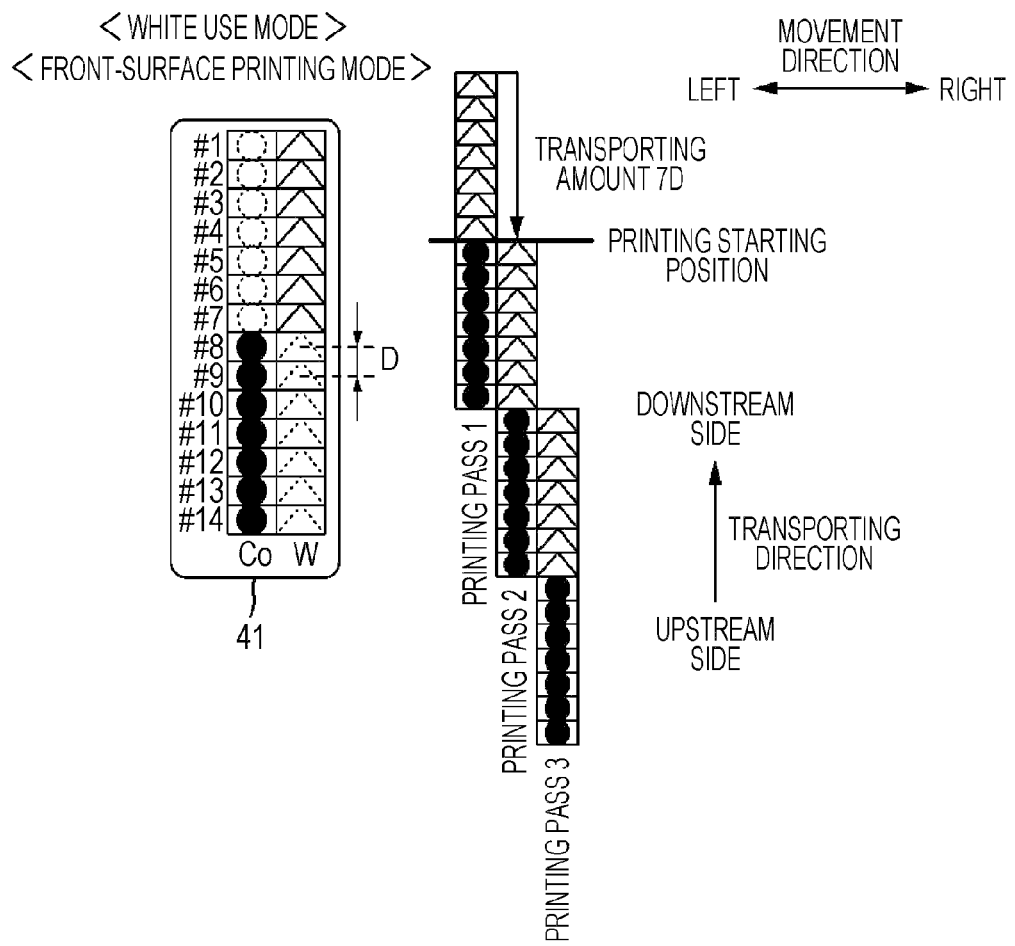
FIG. 4B is a diagram explaining a printing method of the white use mode and a rear-surface printing mode.

FIG. 4A is a diagram explaining printing methods of the white use mode and the front-surface printing mode, and FIG. 4B is a diagram explaining printing methods of the white use mode and the rear-surface printing mode. For simplicity of the explanation in the drawings, the number of the nozzles included in one nozzle row is decreased to 14. In addition, the nozzle row which each ejects inks of four colors (YMCK) is collectively denoted as a "color nozzle row Co". The printing method shown in FIGS. 4A and 4B is a band printing. The band printing means a printing method in which a band image formed by a single pass is aligned in the transporting direction and raster lines of other passes are not formed between raster lines (dot rows along the movement direction) formed by a certain pass.

In the printing method of the white use mode and the front-surface printing mode (FIG. 4A), nozzles #8 to #14 (Δ) of the upstream side half in the transporting direction of the white nozzle row W are use nozzles for printing the background image, and nozzles #1 to #7 (●) of the downstream side half in the transporting direction of the color row Co are use nozzles for printing the main image. In addition, nozzles #1 to #7 of the downstream side half in the transporting direction of the white nozzle row W and nozzles of the upstream side half in the transporting direction of the color nozzle row Co are nonuse nozzles. In addition, the one-time medium transporting amount is a width length in the transporting direction of the background image or the main image formed by a single pass (here, the length of the half of the nozzle row is 7D).

In this way, first, a predetermined region of the medium faces the use nozzles (Δ) of the upstream side in the transporting direction of the white nozzle row W in a certain printing pass, and the background image is printed on the predetermined region of the medium. Thereafter, if the medium is transported to the downstream side in the transporting direction, the predetermined region of the medium faces the use nozzles (●) of the downstream side in the transporting direction of the color nozzle row Co in the next printing pass, and the main image is printed so as to be overlapped on the background image of the predetermined region of the medium.

On the other hand, in the printing method of the white use mode and the rear-surface printing mode (FIG. 4B), nozzles #1 to #7 (Δ) of the downstream side half in the transporting direction of the white nozzle row W are use nozzles for printing the background image, and nozzles #8 to #14 (●) of the upstream side half in the transporting direction of the color row Co are use nozzles for printing the main image. In addition, the one-time medium transporting amount is a width length (7D) in the transporting direction of the background image or the main image formed by a single pass.

In this way, first, a predetermined region of the medium faces the use nozzles (●) of the upstream side in the transporting direction of the color nozzle row Co in a certain printing pass, and the main image is printed on the predetermined region of the medium. Thereafter, if the medium is transported to the downstream side in the transporting direction, the predetermined region of the medium faces the use nozzles (Δ) of the downstream side in the transporting direction of the white nozzle row W in the next printing pass, and the background image is printed so as to be overlapped on the main image of the predetermined region of the medium.

In this way, in the white use mode, the main image and the background image are printed at different printing passes with respect to a predetermined region of the medium. Therefore, the use nozzles for printing the lower layer image are set at upstream side in the transporting direction than the use nozzles for printing the upper layer image. Thereby, since the time interval which prints so as to overlap the background image and the main image is relatively longer, bleeding or color mixture of the image can be suppressed.

However, the invention is not limited to this, all nozzles included in the color nozzle row Co and the white nozzle row W may be used even in the white use mode. In this case, for example, in the case of the front-surface printing mode, after the background image is printed by using all nozzles of the white nozzle row W, the main image is printed on the background image by using all nozzles included in the color nozzle row Co at the next printing pass without transporting the medium. Thereby, the main image and the background image can be printed with respect to a predetermined region of the medium at different printing passes.

Also, in the printing method of the color mode, all nozzles included in the color nozzle row Co may be used, and similarly to the white use mode, the half of the nozzles included in the color nozzle row Co may be used.

In addition, the invention is not limited to the band printing, an interlace printing (printing method in which raster lines are printed by other printing passes between raster lines printed at a certain printing pass) may be performed, and an overlap printing (one raster line is printed by a plurality of nozzles of other printing pass) may be performed.

Shortest Printing Control

FIG. 5 is a diagram explaining the shortest printing control. For the explanation below, in the range in which the head 41 can move in the movement direction, the left end in the movement direction is referred to as a "left side return position LP (corresponding to a home position HP)", and the right end in the movement direction is referred to as a "right side return position RP"). The left side of FIG. 5 shows a case where the shortest printing control is not performed, and the right side of FIG. 5 shows a case where the shortest printing control is performed.

If the shortest printing control is set so as not to be performed, as shown in the left side of FIG. 5, even when the image is printed only on the center portion in the movement direction of the medium, the controller 10 ejects ink from the head 41 while reciprocating the head 41 between the left side return position LP and the right side return position RP. That is, the head 41 moves not only to the printing range of the image but also to the range in which the image is not printed.

On the other hand, if the shortest printing control is set to be performed, as shown in the right side of FIG. 5, the controller 10 cause ink to be ejected from the head 41 while reciprocating head 41 between the left end and the right end of the image. That is, the head 41 moves only to the printing range of the image. However, in a case where the cleaning operation of the head 41 or the like is needed, the head 41 moves to the home position HP.

That is, the shortest printing control is a control which changes the movement distance of the head 41 according to the position of the end (edge) in the movement direction of the image printed. By performing the shortest printing control, the printing time can be shortened.

Printing Method of Comparative Example

FIG. 6 is a diagram explaining a printing method of a comparative example. In the printing method of the comparative example, when the white use mode in which the background image and the main image are printed so as to be overlapped is set, the controller 10 performs the shortest printing control. Moreover, FIG. 6 shows a case where the printing method (hereinafter, referred to as a "bidirectional printing") in which the ink is ejected not only when the head 41 moves to the right side in the movement direction but also when the head 41 moves to the left side is performed and the front-surface printing mode is performed.

To explain the specific printing method, first, in a pass 1 (printing pass 1), the head 41 prints the background image while moving to the right side in the movement direction. If the printing of the right side end of the background image ends, the head 41 does not move to the right return position RP and is stopped at a point in which the printing of the right side end of the background image ends. Next, after the medium moves to the downstream side in the transporting direction, in a pass 2 (printing pass 2), the head 41 prints the main image on the background image printed at the pass 1 while the head 41 moves from the point in which the printing of the right side end of the background image ends to the left side in the movement direction.

Thereby, particularly, in a point P1 on the medium of the side (right side in the movement direction) in which the head 41 moves in the pass 1, the time after the background image is printed until the main image is printed is shortened. Specifically, in the case where the shortest printing control is performed like the comparative example, compared to the case where the shortest printing control is not performed, the time interval (drying time) in which the background image and the main image are printed so as to be overlapped is shortened by the time in which the head 41 reciprocates between the right side end of the background image and the right side return position RP.

That is, if the shortest printing control is performed in the white use mode, the movement distance of the head 41 is shortened, and the time interval in which the background image and the main image are printed so as to be overlapped is shortened. Thereby, the image is bled or the color mixture occurs, and quality of the image is deteriorated.

Thus, in the embodiment, the object is to suppress the deterioration in quality of the image.

First Embodiment

Figure 7A:
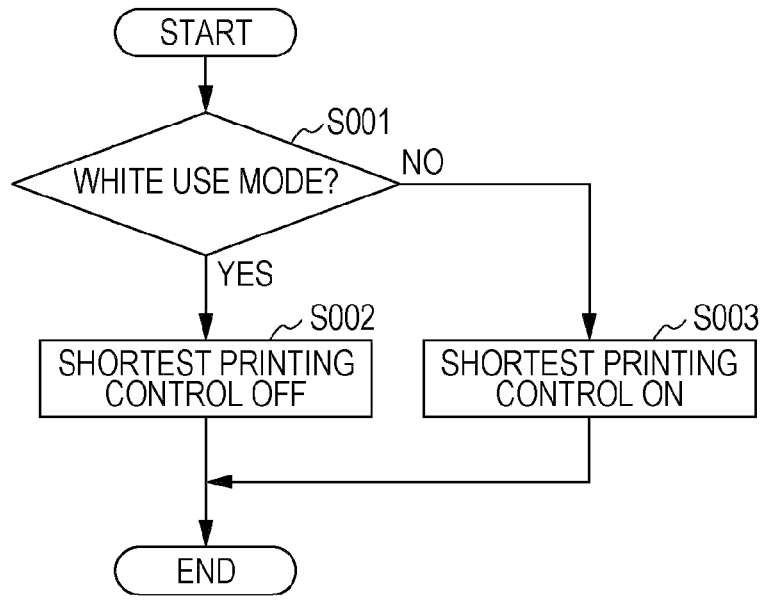
FIG. 7A is a setting flowchart of a printing method in a first embodiment.
Figure 7B:
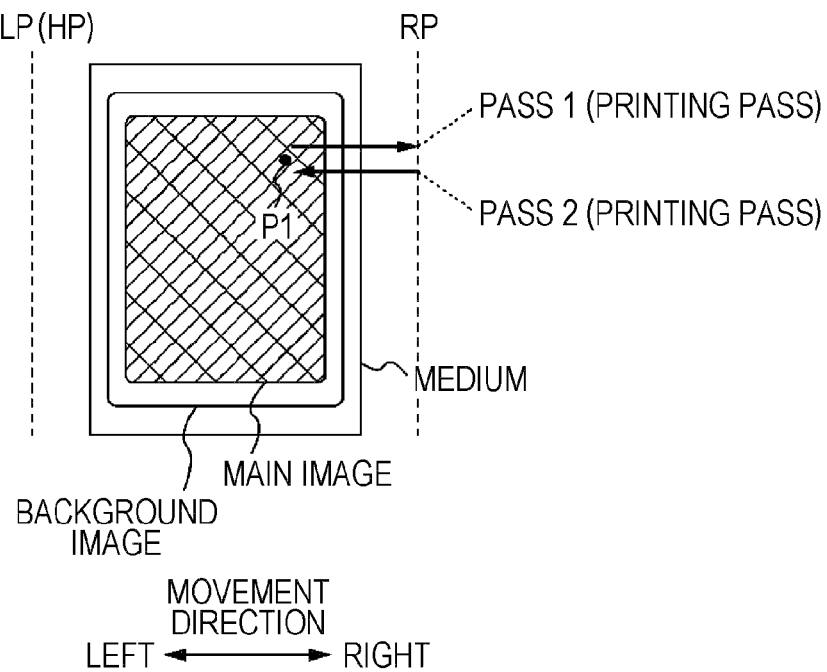
FIG. 7B is a diagram explaining the printing method in the first embodiment.

FIG. 7A is a setting flowchart of a printing method in a first embodiment, and FIG. 7B is a diagram explaining the printing method in the first embodiment. In addition, FIG. 7B shows a case where the bidirectional printing and the front-surface printing mode are performed. In the first embodiment, when the controller 10 receives the printing data of the white use mode (S001→Y), the controller is set so as not to perform the shortest printing control (S002).

That is, when the main image formed by inks of four colors (YMCK) and the background image formed by the white ink (W) are formed so as to be overlapped on the medium at different printing passes, the controller 10 does not perform the control which changes the movement distance in the movement direction of the head 41 according to the position of the end (edge) in the movement direction of the image.

To specifically explain with reference to FIG. 7B, first, the head 41 prints the background image while moving to the right side in the movement direction in the pass 1 (printing pass 1). If the printing of the right side end of the background image ends, the head 41 does not stop at the point and moves to the right side return position RP. Moreover, after the medium is transported to the downstream side in the transporting direction, in the pass 2 (printing pass 2), the head 41 prints the main image on the background image printed at the pass 1 while moving from the right side return position RP to the left side in the movement direction.

Thereby, in the first embodiment compared to the printing method (FIG. 6) of the comparative example, the head 41 moves a longer distance which is twice the distance from the right side end of the background image to the right side return position RP after printing the background image on a certain point P1 on the medium until printing the main image. Therefore, in the first embodiment, compared to the comparative example, the time interval in which the background image and the main image are printed so as to be overlapped can be longer by the time in which the head 41 reciprocates between the right end of the background image and the right return position RP.

That is, due to the fact that the shortest printing control is not performed in the case of the white use mode, the time interval in which the head 41 passes through a certain point P1 on the medium is longer, and the time interval which the main image and the background image is printed so as to be overlapped can be longer. As a result, bleeding or color mixture of the image can be prevented, and deterioration in quality of the image can be suppressed.

In addition, in the first embodiment, when controller 10 receives the printing data of the color mode (S001→N), the controller 10 is set so as to perform the shortest printing control (S003).

That is, when the main image is formed without overlapping the background image on the medium, the controller 10 performs a control which changes the movement distance in the movement direction of the head 41 according to the position of the end (edge) in the movement direction of the image.

Even when the shortest printing control is performed and the time interval in which the head 41 passes through a certain point on the medium is shortened, only the main image is printed on a certain point on the medium in the case of the color mode. Therefore, problems such as bleeding or color mixture of the image are not generated. That is, due to the fact that the shortest printing control is performed in the case of the color mode, the printing time can be shortened without deteriorating the quality of the image.

In addition, in the case of the color mode, the invention is not limited to the case where the controller 10 makes a determination so as to perform the shortest printing control. For example, the user may determine whether or not to perform the shortest printing control. In addition, similarly to the white use mode, also in the case of the color mode, the shortest printing control may not be performed.

Second Embodiment

Figure 8A:
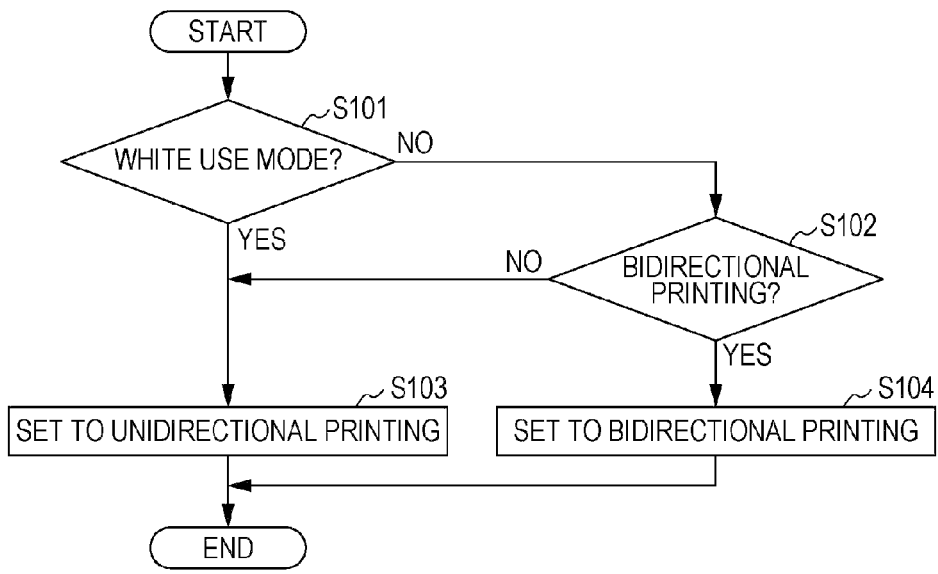
FIG. 8A is a setting flowchart of a printing method in a second embodiment.
Figure 8B:
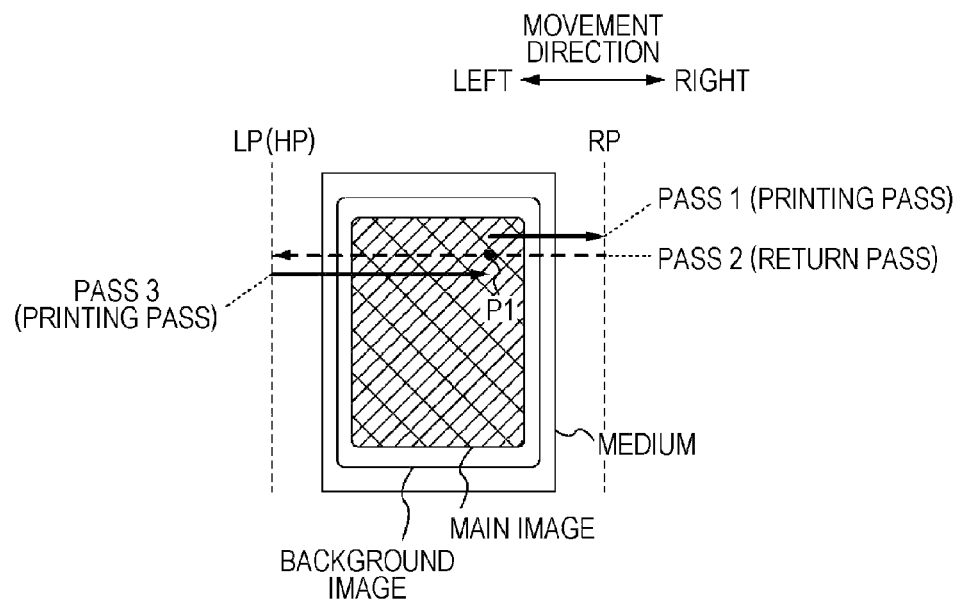
FIG. 8B is a diagram explaining the printing method in the second embodiment.

FIG. 8A is a setting flowchart of a printing method in a second embodiment, and FIG. 8B is a diagram explaining the printing method in the second embodiment. In addition, FIG. 8B shows the case where the front-surface printing mode is performed. In the second embodiment, when the controller 10 receives the printing data of the white use mode (S101→Y), the controller 10 is set so as not to perform the shortest printing control and so as to perform a "unidirectional printing" (S103). The unidirectional printing is a printing method in which ink is ejected only when the head 41 moves to one side in the movement direction and the ink is not ejected when the head 41 moves to the other side in the movement direction.

That is, when the main image and the background image are formed so as to be overlapped, the controller 10 performs a control which ejects the ink from nozzles only when the head 41 moves to one side in the movement direction.

To specifically explain with reference to FIG. 8B, first, the head 41 prints the background image while moving to the right side in the movement direction in the pass 1 (printing pass 1). If the printing of the right side end of the background image ends, the head 41 does not stop at the point and moves to the right side return position RP. Moreover, in pass 2 (return pass), the head 41 does not eject ink and moves from the right side return position RP to the left side return position LP. Thereafter, after the medium is transported to the downstream side in the transporting direction, in pass 3 (printing pass 2), the head 41 prints the main image on the background image printed at the pass 1 while moving from the left side return position LP to the right side in the movement direction.

Thereby, in the second embodiment, compared to the printing method (FIG. 6) of the comparative example, after the background image is printed on a certain point P1 on the medium until the main image is printed, the head 41 moves further by not only the reciprocating distance from the right side end of the background image to the right side return position RP but also the distance from the right side return position RP to the left side return position LP. Therefore, the time interval in which the background image and the main image are printed so as to be overlapped can be even longer.

That is, in the second embodiment, in the case of the white use mode, due to the fact that the unidirectional printing is performed and the return pass is provided between the printing passes, the time interval in which the background image and the main image are printed so as to be overlapped is even longer. As a result, bleeding and color mixture of the image can be further reliably prevented, and deterioration in quality of the image can be suppressed.

On the other hand, when the controller 10 receives the printing data of the color mode (S101→N), user determines whether or not to perform the bidirectional printing (S102). When user determines that the bidirectional printing is not performed (S102→N), the controller 10 is set so as to perform the unidirectional printing (S103). In addition, when user determines that the bidirectional printing is performed (S102→Y), the controller is set so as to perform the bidirectional printing (S104).

However, whether or not the bidirectional printing is performed is not limited to the determination of the user. If the bidirectional printing is performed, the printing time can be shortened. Moreover, if the unidirectional printing is performed, deterioration in quality due to characteristic difference of the reciprocation can be prevented. Thus, for example, the bidirectional printing may be performed when a "fast mode" is set, and the unidirectional printing may be performed when a "clean mode" is set.

Moreover, in the printer 1 of the embodiment, the transporting operation of the medium is not performed at the same time as the return pass. The reason is that the transporting accuracy is decreased due to influences such as mechanical vibration or noise with respect to the driving signal if the transporting operation of the medium is performed at the same time as the return pass, and the control is also complicated. Due to the fact that the transporting operation of the medium is not performed at the same time as the return pass, the time interval between the printing passes is even longer, the time interval in which the background image and the main image are printed so as to be overlapped can be even longer. Therefore, bleeding or color mixture of the image can be further reliably prevented.

Moreover, a movement speed of the head 41 at the time of the printing pass is fixed according to the ink ejecting interval. However, the movement speed of the head 41 at the time of the return pass can be changed. Therefore, in order to reliably prevent bleeding or color mixture of the image, the time interval in which the background image and the main image are printed so as to be overlapped may be longer by decreasing the movement speed of the head 41 at the time of the return pass. On the contrary, when the time interval in which the background image and the main image are printed so as to be overlapped is longer than the time which is needed to prevent bleeding or color mixture of the image, the printing time can be shortened by increasing the movement speed of the head 41 at the time of the return pass.

Third Embodiment

In a third embodiment, since the shortest printing control is not performed at the case of the white use mode, the time interval in which the background image and the main image are printed so as to be overlapped can be longer than that of the comparative example (FIG. 6) as the time in which the head 41 reciprocates from the image end to the right side return position RP or the time in which the head 41 reciprocates from the image end to the left side return position LP.

However, in a case where the distance from the image end to the medium end in the side in which the head 41 moves when the lower layer image (former image) is printed is shorter, the distance in which the head 41 moves after ending the printing of the lower layer image until the medium end becomes shorter. Therefore, the distance in which the head 41 reciprocates from the end of the lower layer image to the right return position RP or the distance in which the head 41 reciprocates from the end of the lower layer image to the left return position LP is shorter. Thereby, if the bidirectional printing is performed in the above case, since the time interval after the head 41 ends the printing of the end of the lower layer image until the head starts the printing of the upper layer image is shorter and the time interval in which the background image and the main image are printed so as to be overlapped is shorter, there is a concern that the bleeding or the color mixture of the image may occur.

On the contrary, in a case where the distance from the image end to the medium end in the side in which the head 41 moves when the lower layer image is printed is longer, the distance in which the head 41 moves after ending the printing of the end of the lower layer image until the medium end becomes longer. Therefore, the distance in which the head 41 reciprocates from the end of the lower layer image to the right return position RP or the distance in which the head 41 reciprocates from the end of the lower layer image to the left return position LP becomes longer. Thereby, even though the bidirectional printing is performed in the above case, since the time interval after the head 41 ends the printing of the end of the lower layer image until the head starts the printing of the upper layer image is longer, that is, since the time interval in which the background image and the main image are printed so as to be overlapped is longer, there is no concern that the bleeding or the color mixture of the image may occur.

Therefore, performing the unidirectional printing or the bidirectional printing may be set according to the distance (distance along the movement direction) from the image end to the medium end in the side in which the head 41 moves when the lower layer image is printed.

That is, in the case where the main image and the background image are printed so as to be overlapped, the controller 10 causes ink to be ejected from the nozzles when the head 41 moves to the same side in the movement direction as the former printing pass in a case where the distance from the image end (edge of the image) of the side supposed to move the head 41 in the movement direction to the medium end (edge of the medium) when the lower layer image (image which is formed with respect to a predetermined region of the medium in advance) is formed is less than a threshold value (performs the unidirectional printing), and the controller 10 causes ink to be ejected from the nozzles when the head 41 moves to the side opposite to the movement direction of the former printing pass in a case where the distance is a threshold value or more (performs the bidirectional printing).

Moreover, in a case where the distance from the image end to the medium end in the side to which the head 41 moves when the lower layer image is printed is a threshold value or more, even though the bidirectional printing is performed, the threshold value is set so that bleeding or color mixture of the image is not generated.

Figure 9A:
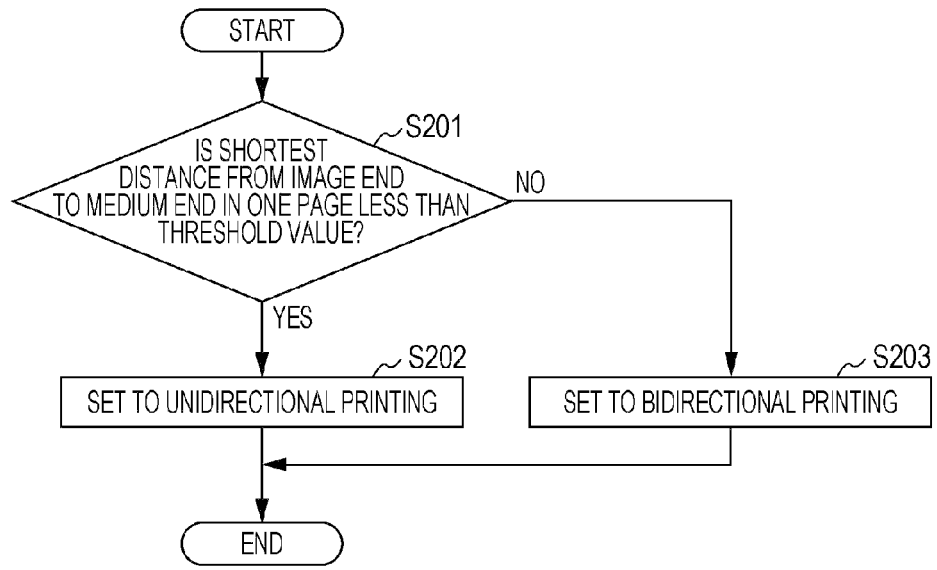
FIG. 9A is a setting flowchart of a printing method in a third embodiment.
Figure 9B:
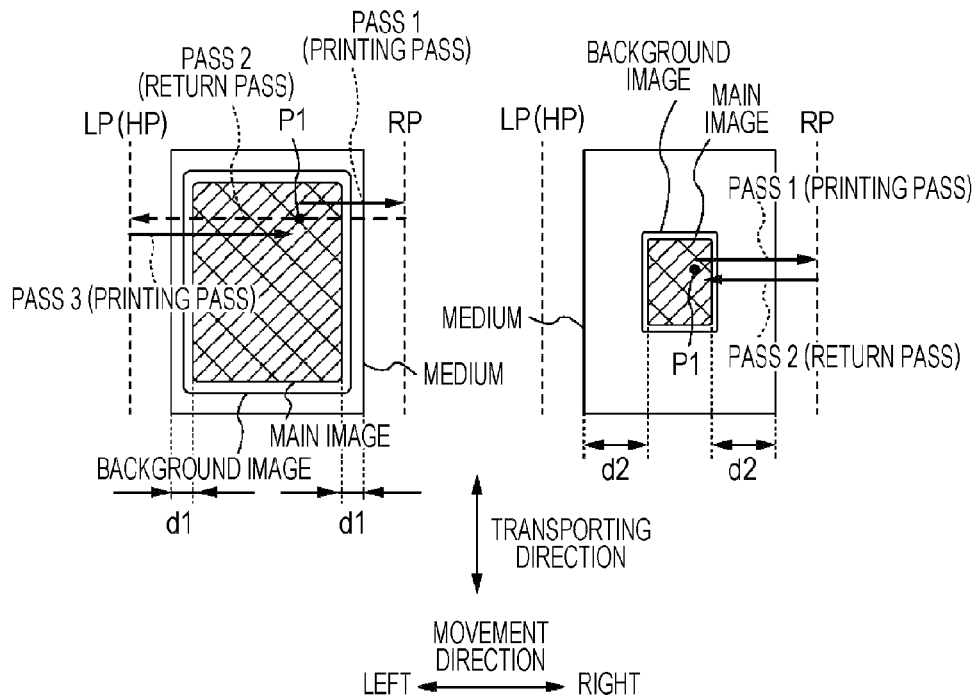
FIG. 9B is a diagram explaining the printing method in the third embodiment.

FIG. 9A is a setting flowchart of the printing method in the third embodiment, and FIG. 9B is a diagram explaining the printing method in the third embodiment. In addition, FIG. 9B shows the case where the front-surface printing mode is performed. In the third embodiment, the controller 10 is set so as to perform the unidirectional printing or the bidirectional printing for each one page (for each image which is printed on one sheet medium).

Thereby, when the controller 10 receives the printing data of the white use mode, the controller 10 is set so as not to perform the shortest printing control. In addition, the controller 10 calculates the shortest distance in the distances from the image end to the medium end in one page based on the printing data and compares the shortest distance and a threshold value (S201 in FIG. 9A). Moreover, when the calculated shortest distance is less than the threshold value (S201→Y), the controller 10 is set so as to perform the unidirectional printing (S202). In addition, when the calculated shortest distance is a threshold value or more (S201→N), the controller is set so as to perform the bidirectional printing (S203).

In addition, in the case where the unidirectional printing is set or in the case where the bidirectional printing is set, the sides to which the head 41 moves when the lower layer image is printed are different from each other. Moreover, in the case where the bidirectional printing is set, the sides to which the head 41 moves when the lower layer image is printed are different for each printing pass. Thereby, the head 41 is supposed to move to either the left side or the right side when the lower layer image is printed, and in the entire region of the image, the shortest distance in the distances of the distance from the right side end of the image to the right side end of the medium and the distance from the left side end of the image to the left end of the medium is calculated.

Moreover, the distance from the end of the main image to the medium end may be calculated, and the distance from the end of the background image to the medium end may be calculated. In addition, a distance from the end of the larger image in two images to the medium end may be calculated, and a distance from the end of smaller image to the medium end may be calculated.

This will be specifically described with reference to FIG. 9B. In addition, here, the case where the background image is larger than the main image and the distance from the end of the main image to the medium end is calculated is described as the example. In the image shown in the left side of FIG. 9B, since the image is printed so as to be large with respect to the medium, the shortest distance d1 from the main image end to the medium end in the same side in the movement direction becomes shorter and less than a threshold value. In this case, the controller 10 is set so as to print the image of the left side in FIG. 9B through the unidirectional printing (that is, the return pass is provided between the printing passes, and ink is ejected from the nozzles when the head 41 moves to the same side as the movement direction of the former printing pass).

Thereby, even though the distance d1 from the right side end of the main image to the right end of the medium is shorter and the time after the head 41 prints the background image at a certain point P1 on the medium while the head 41 moves to the right side in the movement direction in the pass 1 until the head 41 passes through a certain point P1 on the medium while the head 41 moves to the left side in the movement direction in the pass 2 is shorter, since the main image is not printed at the pass 2, bleeding or color mixture of the image can be prevented.

On the other hand, in an image shown in the right side of FIG. 9B, since the image having narrow width in the movement direction is printed on the center portion of the medium, the shortest distance d2 from the main image end to the medium end in the same side in the movement direction becomes longer and a threshold value or more. In this case, the controller 10 is set so as to print the image of the right side in FIG. 9B through the bidirectional printing (that is, the return pass is not provided between the printing passes, and ink is ejected from the nozzles when the head 41 moves to the side opposite to the movement direction of the former printing pass).

Thereby, even though the head 41 prints the background image at a certain point P1 on the medium while the head 41 moves to the right side in the movement direction in the pass 1 and the head 41 prints the main image on the background image of a certain point P1 on the medium while the head 41 moves to the left side in the movement direction in the pass 2, since the distance d2 from the right side end of the main image to the right side end of the medium is longer and the time interval in which the head 41 passes through a certain point P1 on the medium is longer, bleeding or color mixture of the image can be prevented.

Conversely, the return pass is provided between the printing passes regardless of the length of the time interval in which the head 41 passes through a certain point P1 on the medium, and it is possible to prevent the time interval in which the background image and the main image are printed so as to be overlapped from being longer than necessary. That is, it is possible to prevent the printing time from being needlessly long.

Figure 10:
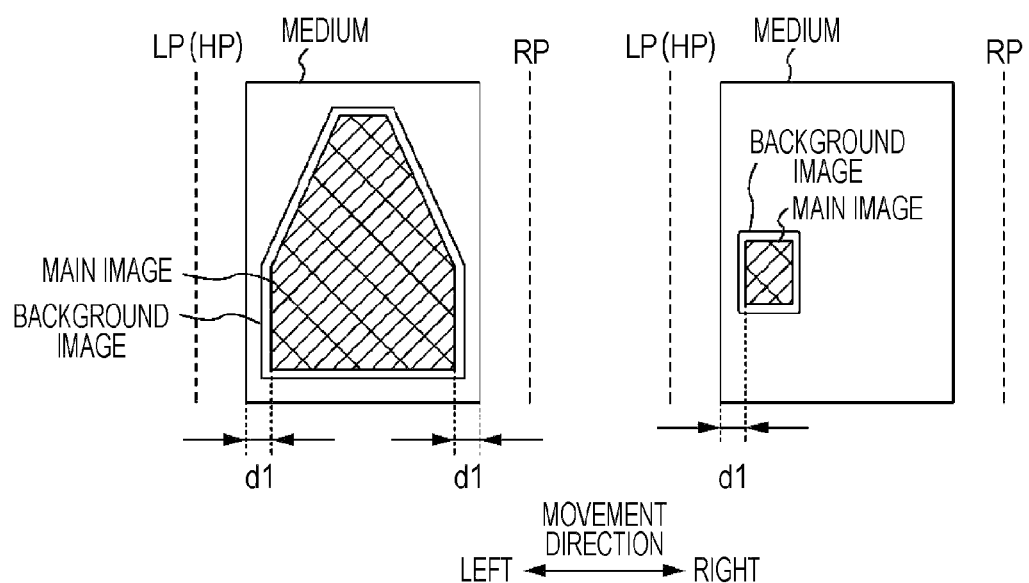
FIG. 10 is a diagram explaining the shortest distance from an image end to a medium end in another image.

FIG. 10 is a diagram explaining the shortest distance from the image end to the medium end in another image. In the image shown in FIG. 9B, since the lateral edges of the image in the movement direction run along the transporting direction, the distance from the image end to the medium end is the same in the entire region in the transporting direction. In addition, since the image shown in FIG. 9B is printed at the center portion in the movement direction of the medium, the distance from the left side end of the image to the left side end of the medium is the same as the distance from the right side end of the image to the right side end of the medium. However, the invention is not limited to the image shown in FIG. 9B.

For example, like an image of the left side of FIG. 10, there is an image in which the width in the movement direction is widened from the upper portion to the lower portion in the image. In this case, the distance d1 from the image end to the medium end in the lower portion of the image becomes the shortest distance. When the shortest distance d1 is less than a threshold value, the upper portion and the lower portion of the image are printed through the unidirectional printing in the third embodiment.

In addition, like an image of the right side in FIG. 10, even though the width in the movement direction of the image is narrow, a case where the image is biased to the one side (the left side in FIG. 10) in the movement direction with respect to the medium and printed may be generated. In this case, if the distance from the image end of the side to which the image is biased to the medium end is shorter and less than a threshold value, the image is printed through the unidirectional printing.

Moreover, the invention is not limited to the case where the shortest distance is calculated in the distance from the right side end of the image to the right side end of the medium and the distance from the left side end of the image to the left side end of the medium in the entire region of the image. The image is supposed to be printed through the bidirectional printing, for each region on which the image is printed by one-time printing pass, the shortest distance from the image end to the medium end in the side to which the head 41 moves may be calculated when the lower layer image is printed at each region.

For example, the shortest distance from the right side end of the image printed on a certain region on the medium to the right side end of the medium is calculated when the head 41 prints the lower layer image on a certain region on the medium while moving to the right side in the movement direction at the printing pass 1, and the shortest distance from the left side end of the image printed on the other region on the medium to the left side end of the medium is calculated when the head 41 prints the lower layer image on the other region on the medium while moving to the left side in the movement direction at the printing pass 2.

In addition, the smallest distance in the shortest distances of each region and a threshold value are compared to each other, performing the unidirectional printing or the bidirectional printing may be set.

Fourth Embodiment

Figure 11:
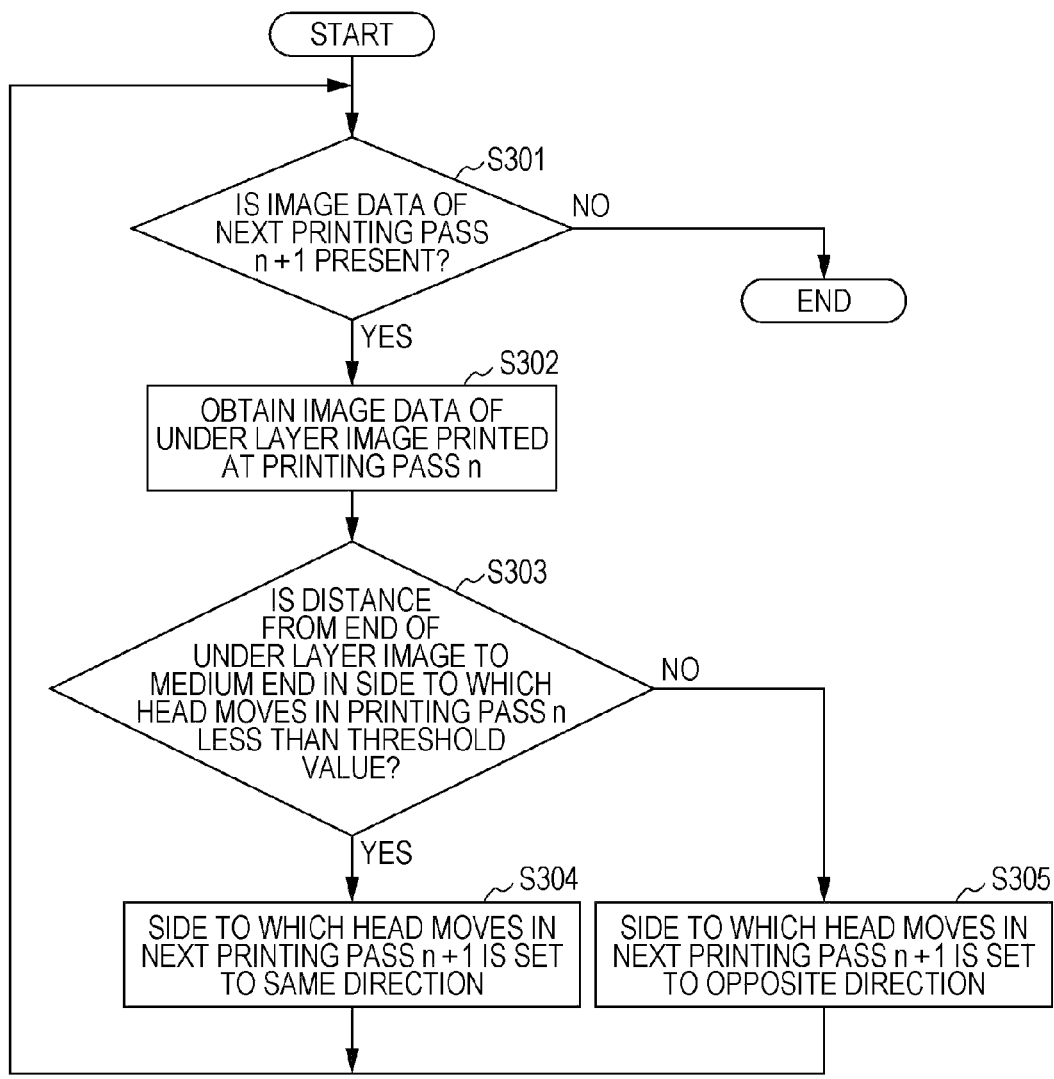
FIG. 11 is a setting flowchart of a printing method in a fourth embodiment.
Figure 12:
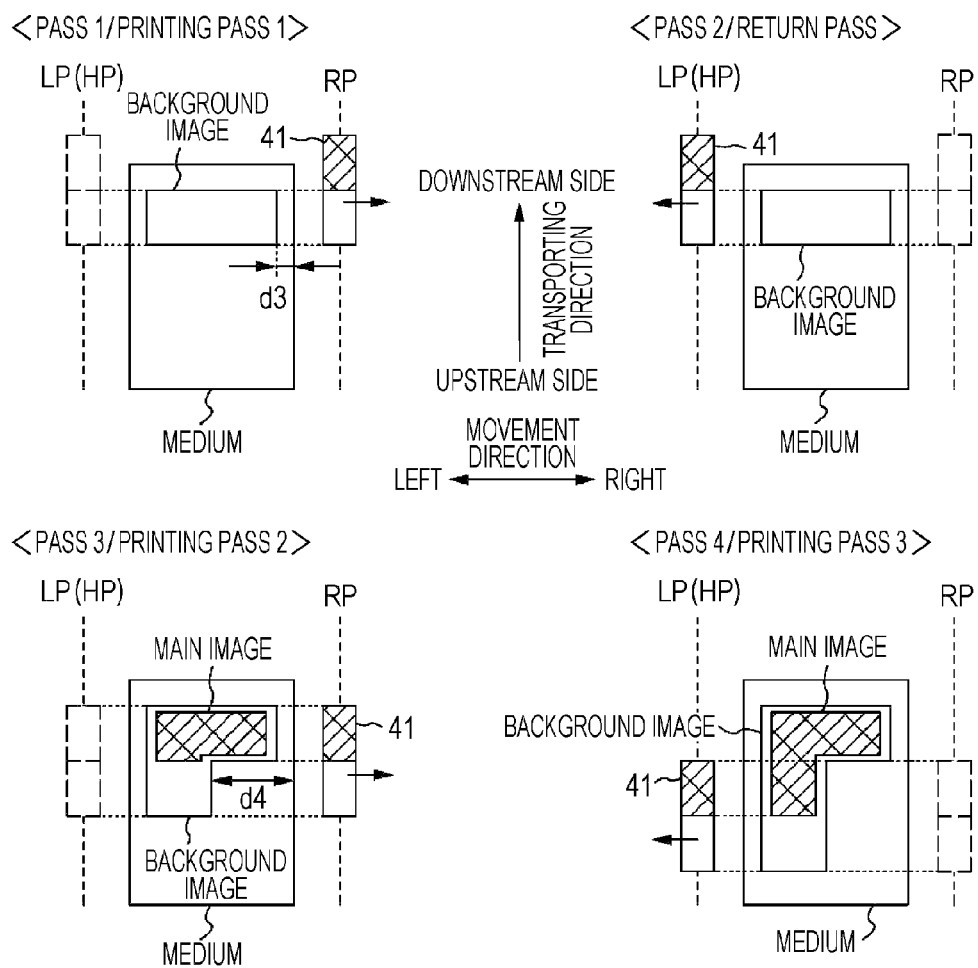
FIG. 12 is a diagram explaining the printing method in the fourth embodiment.

FIG. 11 is a setting flowchart of a printing method in a fourth embodiment, and FIG. 12 is a diagram explaining the printing method in the fourth embodiment. In addition, FIG. 12 shows the case where the front-surface printing method is performed. In the fourth embodiment, the direction to which the head 41 moves is determined for each printing pass (that is, whether or not to eject ink from the nozzles is determined according to the side where the head 41 moves in the movement direction). Based on the distance from the end of one side in the movement direction of the lower layer image which the head 41 prints while moving to one side in the movement direction in a certain printing pass to the end of one side in the movement direction of the medium, the direction to which the head 41 moves in the next printing pass is determined.

Thereby, when the controller 10 receives the printing data of the white use mode, the controller 10 is set so as not to perform the shortest printing control, and the direction to which the head 41 moves for each printing pass is determined. As shown in FIG. 11, first, the controller 10 confirms whether or not the image data of the next printing pass n+1 of a certain printing pass n is present (S301). When the image data of the next printing pass n+1 is present (S301→Y), the controller 10 obtains the image data of the lower layer image which is printed at a certain printing pass n (S302). In addition, the controller 10 calculates the distance from the end of the lower layer image to the medium end in the side in which the head 41 moves at a certain printing pass n based on the obtained image data, and compares the calculated distance and a threshold value (S303).

When the calculated distance is less than the threshold value (S303→Y), the controller 10 provides the return pass between a certain printing pass n and the next printing pass n+1, and sets the direction in which the head moves at the next printing pass n+1 to be the same as the direction in which the head 41 moves at a certain printing pass n (S304). On the other hand, when the calculated distance is the threshold value or more (S303→N), the controller 10 does not provide the return pass between a certain printing pass n and the next printing pass n+1, and sets the direction in which the head 41 moves at the next printing pass n+1 to be opposite to the direction in which the head 41 moves at a certain printing pass n (S305). The controller 10 repeatedly performs this processing until the data of the next printing pass is lost.

That is, in the case where the main image and the background image are formed so as to overlapped, when the distance, which is from the end (edge) of one side in the movement direction of the lower layer image (the image which is formed in advance with respect to a predetermined region of the medium) formed at the time of a certain printing pass in which the head 41 moves to one side in the movement direction to the end (edge) of one side in the movement direction of the medium, is less than a threshold value, at the time of the next printing pass of a certain printing pass, the controller 10 causes ink to be ejected from the nozzles when the head 41 moves to one side (the same side) in the movement direction, when the distance is a threshold value or more, at the time of the next printing pass of a certain printing pass, the controller ink to be ejected from the nozzles when the head 41 moves to other side (the opposite side) in the movement direction.

Thereby, when the distance which the head 41 moves after ending the printing of the lower layer image at a certain printing pass to the medium end is shorter, that is, the distance which the head 41 reciprocates between the end of the lower layer image and the right side return position RP or between the end of the lower layer image and the left side return position LP is shorter, and when the time interval in which the head 41 passes through a certain point on the image printing region is shorter, the return pass is provided between the printing passes (the directions in which the head 41 moves at the former and the later printing passes becomes the same as each other, that is, become the same movement as the unidirectional printing). Therefore, the time interval in which the background image and the main image are printed so as to be overlapped can be longer and bleeding or color mixture of the image can be prevented, and deterioration in quality of the image can be suppressed.

On the other hand, when the distance in which the head 41 moves after ending the printing of the lower layer image at a certain printing pass to the medium end is longer, that is, the distance in which the head 41 reciprocates between the end of the lower layer image and the right side return position RP or between the end of the lower layer image and the left side return position LP is longer, and the time interval in which the head 41 passes through a certain point on the image printing region is longer, the return pass is not provided between the printing passes (the directions in which the head 41 moves at the former and the later printing passes become opposite as each other, that is, become the same movement as the bidirectional printing). Therefore, it is possible to prevent the time interval in which the background image and the main image are printed so as to be overlapped from being longer than necessary, the printing time can be shortened while preventing bleeding or color mixture of the image.

To specifically explain with reference to FIG. 12, first, in the pass 1 (printing pass 1), the head 41 prints the background image (lower layer image) while moving to the right side in the movement direction. A distance d3 from the right side end of the background image printed at the pass 1 to the right side end of the medium is shorter and less than a threshold value. In this case, the controller 10 causes ink to be ejected from the nozzles when the head 41 moves to the same side (the right side) as the printing pass 1 at the next printing pass 2. Therefore, the pass 2 becomes the return pass.

In addition, after the pass 2 and after the medium is transported to the downstream in the transporting direction, the head 41 prints the background image and the main image while moving to the right side in the movement direction in a pass 3 (printing pass 2). A distance d4 from the right side end of the background image printed at the pass 3 to the right side end of the medium is longer and a threshold value or more. In this case, in the next printing pass 3, the controller 10 causes ink to be ejected from the nozzles when the head 41 moves to the side (the left side) opposite to the printing pass 2. Therefore, the return pass is not provided between the pass 3 and the pass 4, after the medium is transported to the downstream side in the transporting direction after the pass 3, the head 41 prints the background image and the main image while the head 41 moves to the left side in the movement direction in the pass 4 (printing pass 3).

In addition, since the front-surface printing mode is explained as the example in FIG. 12, the background image becomes the lower layer image, and the distance from the end of the background image to the medium end is compared with a threshold value. On the other hand, in the case of the rear-surface printing mode (not shown), the main image becomes the lower layer image, and the distance from the end of the main image to the medium end is compared with a threshold value. Therefore, when the sizes of the main image and the background image are different from each other, the distances compared with the threshold value are slightly different to each other.

Fifth Embodiment

Figure 13:
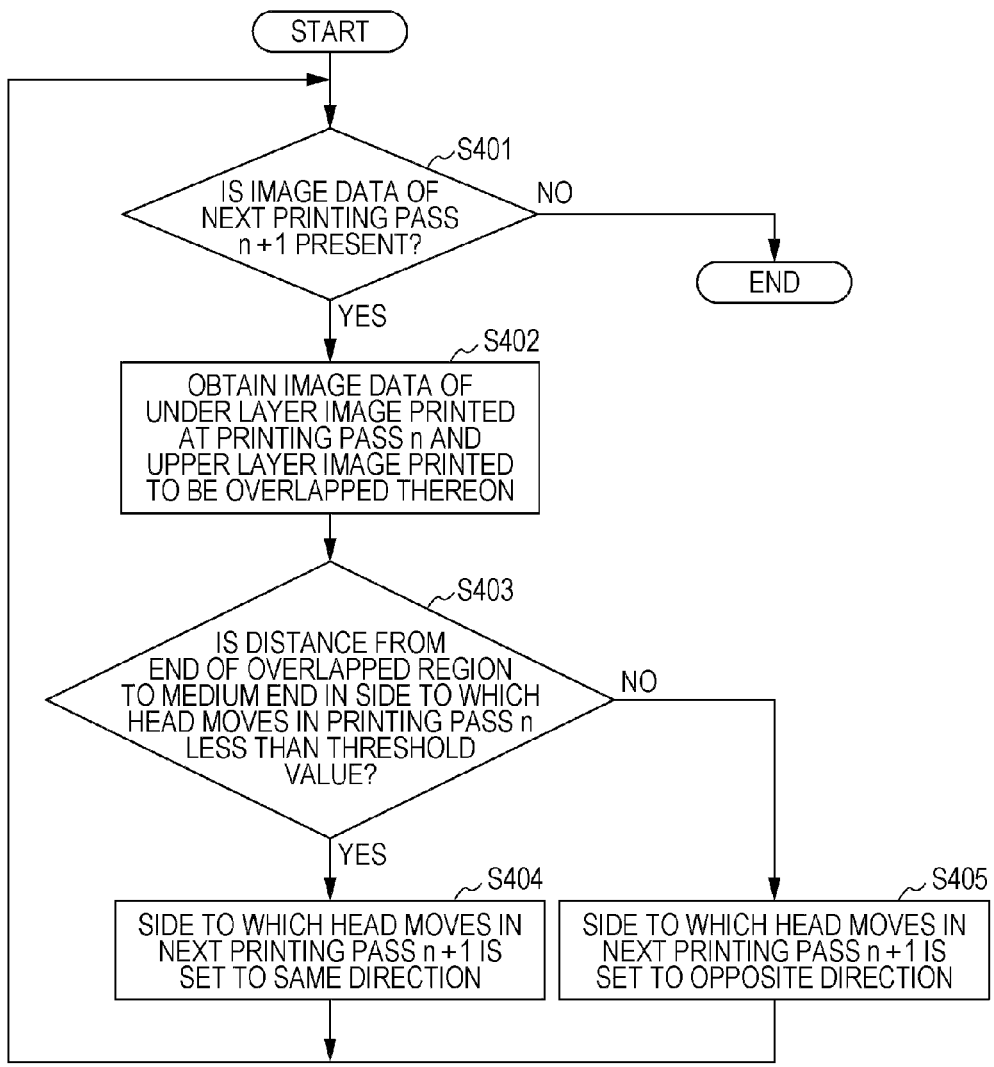
FIG. 13 is a setting flowchart of a printing method in a fifth embodiment.
Figure 14A:
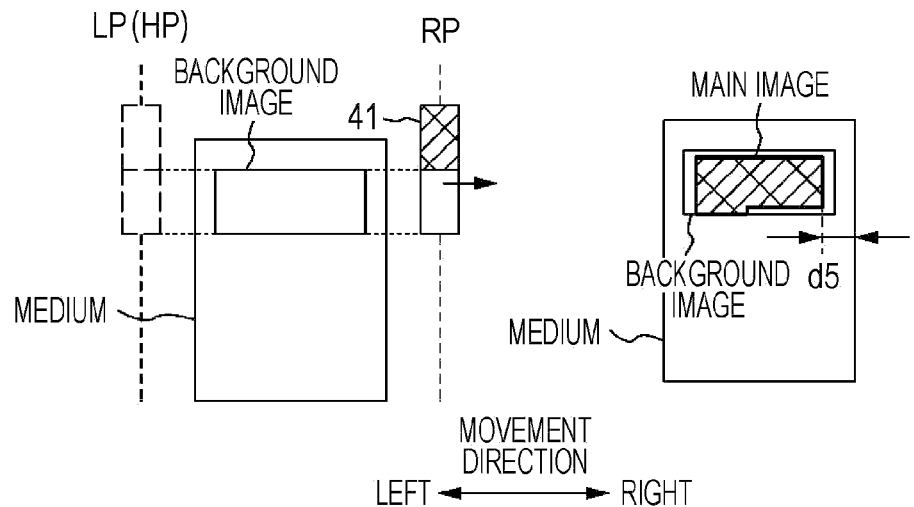
FIG. 14A is a diagram explaining the printing method in the fifth embodiment.
Figure 14B:
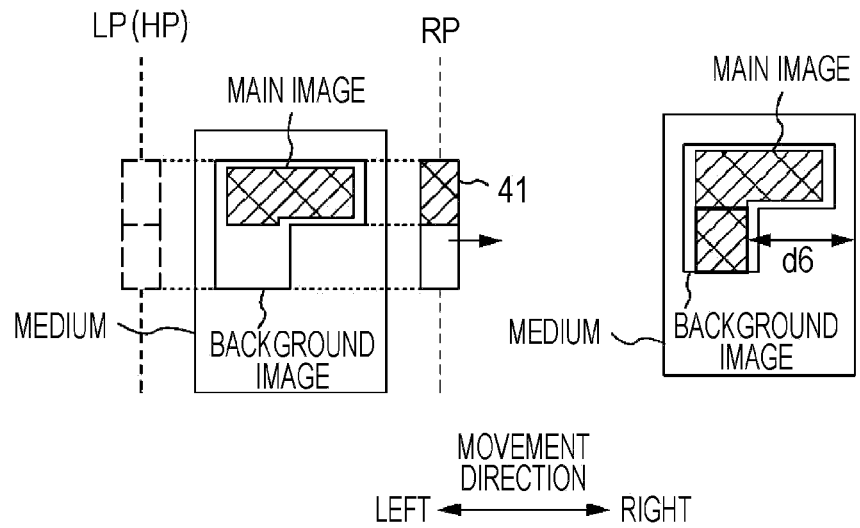
FIG. 14B is a diagram explaining the printing method in the fifth embodiment.

FIG. 13 is a setting flowchart of a printing method in a fifth embodiment, and FIGS. 14A and 14B are diagrams explaining the printing method in the fifth embodiment. In addition, FIGS. 14A and 14B show the case where the front-surface printing mode is performed. In the fifth embodiment, the direction to which the head 41 moves is determined for each printing pass. In addition, the direction to which the head 41 moves at the next printing pass is determined based on the distance from the end of one side in the movement direction of the region which overlaps the lower layer image which the head 41 prints while moving to one side in the movement direction in a certain printing pass and the upper layer image overlapped on the lower layer image to the end of one side in the movement direction of the medium.

Thereby, when the controller 10 receives the printing data of the white use mode, the controller is set so as not to perform the shortest printing control and determines the direction to which the head 41 moves at each printing pass. As shown in FIG. 13, first, the controller 10 confirms whether or not the image data of the next printing pass n+1 of a certain printing pass n is present (S401). When the image data of the next printing pass n+1 is present (S401→Y), the controller 10 obtains the image data of the lower layer image printed at a certain printing pass n and the image data of the upper layer image printed so as to be overlapped on the lower layer image (S402). Hereinafter, the region which overlaps the lower layer image printed at a certain printing pass n and the upper layer image to be overlapped on the lower layer image is referred to as an "overlapped region". In addition, the controller 10 calculates the distance from the end of the overlapped region in the side to which the head 41 moves in a certain printing pass n to the medium end based on the obtained image data, and compares the calculated distance and a threshold value (S403).

When the calculated distance is less than the threshold value (S403→Y), the controller 10 provides the return pass between a certain printing pass n and the next printing pass n+1, and sets the direction in which the head moves at the next printing pass n+1 to be the same as the direction in which the head 41 moves at a certain printing pass n (S404). On the other hand, when the calculated distance is the threshold value or more (S403→N), the controller 10 does not provide the return pass between a certain printing pass n and the next printing pass n+1, and sets the direction in which the head 41 moves at the next printing pass n+1 to be opposite to the direction in which the head 41 moves at a certain printing pass n (S405). The controller 10 repeatedly performs this processing until the data of the next printing pass is lost.

That is, in the case where the main image and the background image are formed so as to overlapped, when the distance, which is from the end (edge) of one side in the movement direction of the region overlapped with an image formed later in the images formed in advance with respect to a predetermined region of the medium at the time of a certain printing pass in which the head 41 moves to one side in the movement direction to the end (edge) of one side in the movement direction of the medium, is less than a threshold value, at the time of the next printing pass of a certain printing pass, the controller 10 causes ink to be ejected from the nozzles when the head 41 moves to one side (the same side) in the movement direction, when the distance is a threshold value or more, at the time of the next printing pass of a certain printing pass, the controller causes ink to be ejected from the nozzles when the head 41 moves to other side (the opposite side).

Therefore, when the time, which is from the time when the head 41 ends the printing of the lower layer image while moving to one side in the movement direction at a certain printing pass to the time when the head passes through the end of one side in the movement direction of the medium and passes through (the point when printing) the end of one side in the movement direction of the overlapped region of the lower layer image and the upper layer image when returning and coming from the right side return position RP or the left side return position LP, is shorter, the upper layer image is not printed when the head 41 returns. Thereby, the time interval in which the background image and the main image are printed so as to be overlapped becomes longer, bleeding or color mixture of the image can be prevented, and deterioration in quality of the image can be suppressed.

On the other hand, when the time, which is from the time when the head 41 ends the printing of the lower layer image while moving to one side in the movement direction at a certain printing pass to the time when the head passes through the end of one side in the movement direction of the medium and passes through (the point when printing) the end of one side in the movement direction of the overlapped region of the lower layer image and the upper layer image when returning and coming from the right side return position RP or the left side return position LP, is longer, the upper layer image is printed when the head 41 returns. Thereby, it is possible to prevent the time interval in which the background image and the main image are printed so as to be overlapped from being longer than necessary, the printing time can be shortened while preventing bleeding or color mixture of the image.

To specifically explain with reference to FIGS. 14A and 14B, first, as shown in the left side of FIG. 14A, in the pass 1 (printing pass 1), the head 41 prints the background image (lower layer image) while moving to the right side in the movement direction. As shown in the right side of FIG. 14A, the main image is printed so as to be overlapped on the background image which is printed at the printing pass 1. A distance d5 from the right side end of the overlapped region (a thick-bordered box) of the main image and the background image to the right side end of the medium is shorter and less than a threshold value. In this case, the controller 10 ink to be ejected from the nozzles when the head 41 moves to the same side (the right side) as the printing pass 1 at the next printing pass 2. Therefore, pass 2 (not shown) becomes the return pass.

In addition, after the pass 2 is performed and the medium is transported to the downstream in the transporting direction, as shown in the left side of FIG. 14B, the head 41 prints the background image and the main image while moving to the right side in the movement direction in the pass 3 (printing pass 2). As shown in the right side of FIG. 14B, the main image is printed so as to be overlapped on the background image which is printed at the printing pass 2. A distance d6 from the right side of the overlapped region (thick-bordered box) of the background image and the main image printed at the pass 3 to the right side end of the medium is longer and a threshold value or more. In this case, in the next printing pass 3, the controller 10 causes ink to be ejected from the nozzles when the head 41 moves to the side (the left side) opposite to the printing pass 2. Therefore, the return pass is not provided between the pass 3 and the pass 4.

Sixth Embodiment

In the fourth embodiment and the fifth embodiment described above, the direction in which the head 41 moves is determined for each printing pass. Thereby, in the fourth embodiment, the distance from the end of one side in the movement direction of the lower layer image which the head 41 prints while moving to one side in the movement direction in a certain printing pass to the end of one side in movement direction of the medium is compared with a threshold value. Moreover, in the fifth embodiment, the distance from the end of one side in the movement direction of the region, in which the lower layer image in which the head 41 prints while moving to one side in the movement direction in a certain printing pass and the upper layer image to be overlapped on the lower layer image are overlapped, to the end of one side in the movement direction of the medium is compared with a threshold value.

Also in the sixth embodiment, the direction to which the head 41 moves is determined for each printing pass. In addition, the distance from the end (edge) of one side in the movement direction of the upper layer image which is printed so as to be overlapped on the lower layer image which the head 41 prints while moving to one side in the movement direction at a certain printing pass to the end (edge) of the one side in the movement direction of the medium is compared with threshold value. If the distance is less than the threshold value, the controller 10 provides the return pass between a certain printing pass and the next printing pass, and sets the direction in which the head 41 moves at the next printing pass to be the same as the direction in which the head 41 moves at a certain printing pass. Moreover, if the distance is a threshold value or more, the controller 10 does not provide the return pass between a certain printing pass and the next printing pass, and sets the direction in which the head 41 moves at the next printing pass so as to be opposite to the direction in which the head 41 moves at a certain printing pass.

Thereby, when the head 41 returns and comes from the right side return position RP or the left side return position LP after printing the lower layer image while moving to one side in the movement direction at a certain printing pass, in the case where the time from when the head 41 passes through the end of one side in the movement direction of the medium to when (the point when the end is printed) the head passes through the end of one side in the movement direction of the upper layer image is shorter, the upper layer image is not printed when the head 41 returns. Therefore, the time interval in which the background image and the main image are printed so as to be overlapped can be longer and bleeding or color mixture of the image can be prevented.

On the other hand, when the head 41 returns and comes from the right side return position RP or the left side return position LP after printing the lower layer image while moving to one side in the movement direction at a certain printing pass, in the case where the time from when the head 41 passes through the end of one side in the movement direction of the medium to when the head passes through the end of one side in the movement direction of the upper layer image is longer, the upper layer image is printed when the head 41 returns. Therefore, it is possible to prevent the time interval in which the background image and the main image are printed so as to be overlapped from being longer than necessary, and the printing time can be shortened without deteriorating quality of the image.

Seventh Embodiment

Figure 15:
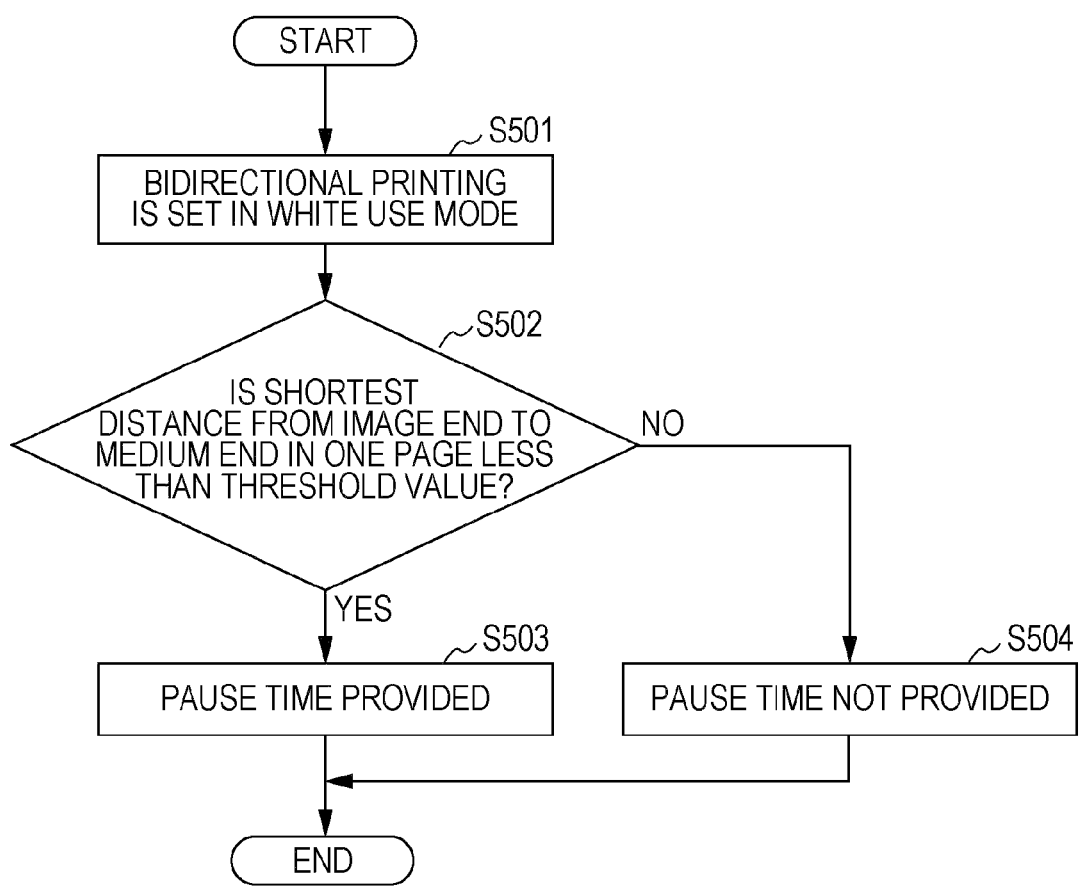
FIG. 15 is a setting flowchart of a printing method in a seventh embodiment.

FIG. 15 is a setting flowchart of a printing method in a seventh embodiment. In the third to the sixth embodiments described above, whether or not the return pass is provided between printing passes is determined according to the distance from the image end in the side to which the head 41 moves when printing the lower layer image to the medium end (that is, whether or not the unidirectional printing is performed is determined).

With respect to this, in the seventh embodiment, the bidirectional printing is always performed in the case of the white use mode. In addition, in the case where the distance from the image end in the side to which the head 41 moves when printing the lower layer image to the medium end is shorter, a pause time is provided between the printing passes. That is, the head 41 is stopped in only a predetermined time at the right return position RP or the left return position LP. Therefore, in the case where the distance from the image end to the medium end in the side to which the head 41 moves when printing the lower layer image is shorter, compared to in the case where a general bidirectional printing is performed, the time interval between the former and the later printing passes becomes longer. Thereby, for example, a counter which counts the pause time may be provided in the controller 10. In addition, the pause time may be longer as the distance from the image end to the medium end in the side to which the head 41 moves when printing the lower layer image is shorter.

That is, in the case where the main image and the background image are formed so as to be overlapped, the controller 10 performs a control which eject fluid from the nozzles when the head 41 moves to both directions in the movement direction, when the distance from the image end (edge) to the medium end (edge) in the side to which the head 41 moves in the movement direction when printing the lower layer image is less than a threshold value, the time interval of the printing pass is longer compared to the case where the distance is a threshold or more.

Thereby, in the case where the distance from the image end to the medium end in the side to which the head 41 moves when printing the lower layer image is shorter and the time interval in which the head 41 passes through a certain point on the image printing region is shorter, the pause time is provided, and the time interval in which the background image and the main image are printed so as to be overlapped can be longer. On the contrary, in the case where the distance from the image end to the medium end in the side to which the head 41 moves when printing the lower layer image is longer and the time interval in which the head 41 passes through a certain point on the image printing region is longer, the pause time is not provided, and it is possible to prevent the time interval in which the background image and the main image are printed so as to be overlapped from being longer than necessary. As a result, the printing time can be suppressed while preventing bleeding or color mixture of the image.

Thereby, for example, as shown in the flowchart of FIG. 15, the controller 10 may set whether or not the pause time is provided for each page (for each image which is printed on one sheet medium). Specifically, in the case where the controller 10 receives the printing data of the white use mode (S501), the controller 10 calculates (similarly to the third embodiment) the shortest distance in the distances from the image end to the medium end in one page based on the printing data and compares the shortest distance and a threshold (S502). In addition, in the case where the calculated shortest distance is less than the threshold value (S502→Y), the controller 10 provides the pause time between the printing passes (S503). Moreover, in the case where the calculated shortest distance is the threshold value or more (S502→N), the controller 10 does not provide the pause time between the printing passes (S504).

In addition, the invention is not limited to this. That is, whether or not the pause time is provided for each printing pass may be determined. Thereby, like the fourth embodiment, the distance from the end of one side in the movement direction of the lower layer image which the head 41 prints while moving to one side in the movement direction in a certain printing pass to the end of one side in the movement direction of the medium is calculated, and in the case where the distance is less than a threshold, the pause time may be provided between a certain printing pass and the next printing pass.

In addition, like the fifth embodiment, the distance from the end of one side in the movement direction of the region which overlaps the lower layer image which the head 41 prints while moving to one side in the movement direction in a certain printing pass and the upper layer image overlapped on the lower layer image to the end of one side in the movement direction of the medium is calculated, and in the case where the distance is less than a threshold value, the pause time may be provided between a certain printing pass and the next printing pass.

Moreover, like the sixth embodiment, the distance from the end of one side in the movement direction of the upper layer image which is printed so as to be overlapped on the lower layer image which the head 41 prints while moving to one side in the movement direction in a certain printing pass to the end of one side in the movement direction of the medium is calculated, and in the case where the distance is less than a threshold, the pause time may be provided between a certain printing pass and the next printing pass.

Eighth Embodiment

In the printing method of the white use mode described above, the nozzles of the color nozzle row Co half and the nozzles of the white nozzle row W half are used in each printing pass. In addition, the main image and the background image are printed at each printing pass. That is, in the printing method of the white use mode described above, both the lower layer image and the upper layer image are printed in each printing pass.

On the other hand, in each printing pass, the lower layer image is printed in advance by using one of the color nozzle row Co and the white nozzle row W, thereafter, reverse transporting (back feeding) is performed, and the upper layer image can be printed on the lower layer image by using the other nozzle row. Thereby, all the nozzles of the color nozzle row Co and the white nozzle row can be used, and nonuse nozzles can be decreased.

Figure 16A:
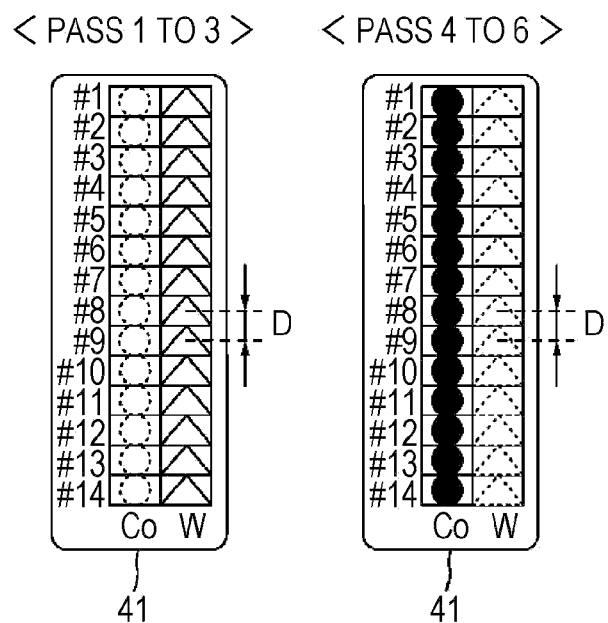
FIG. 16A is a diagram explaining use nozzles in an eighth embodiment.
Figure 16B:
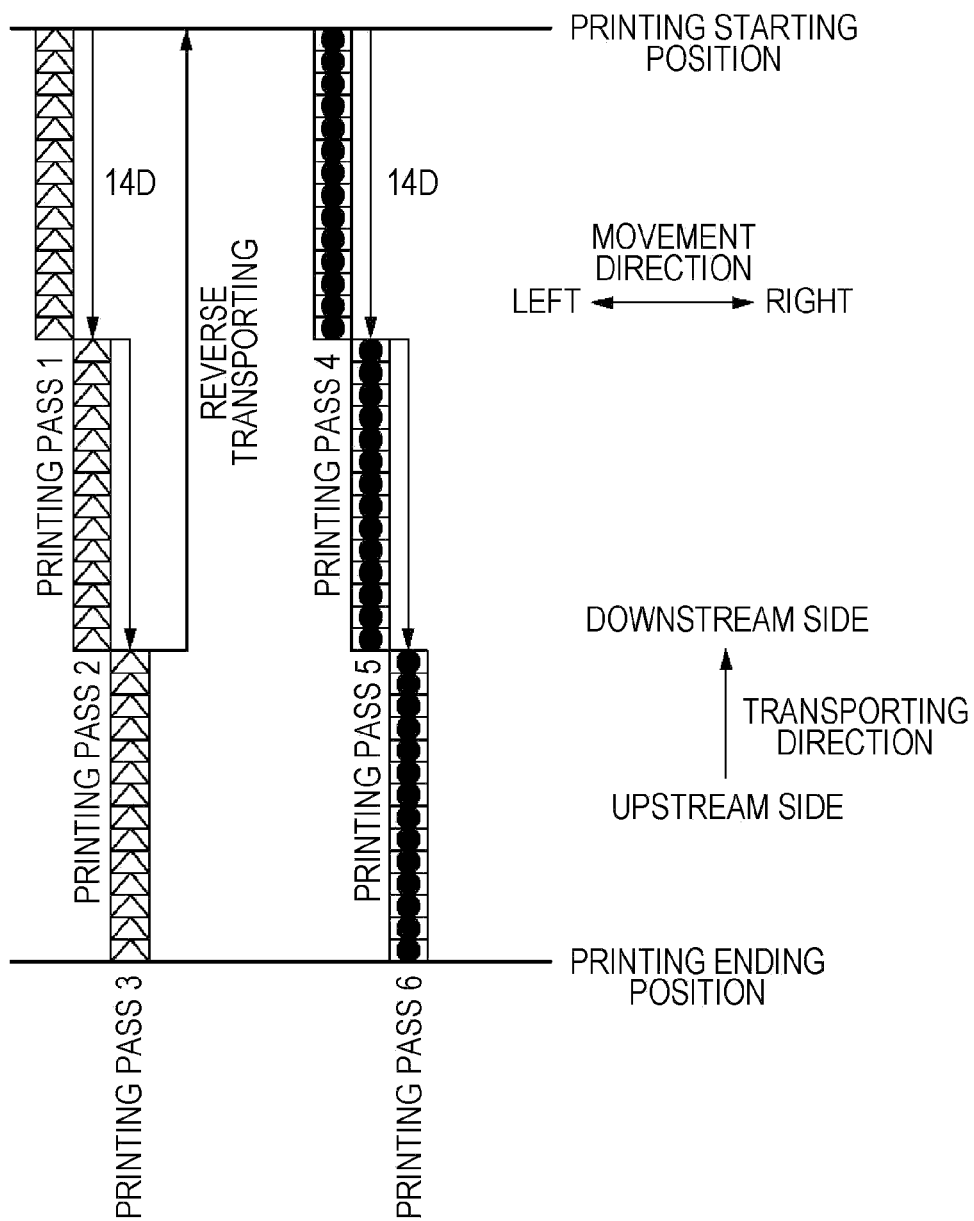
FIG. 16B is a diagram explaining a printing method in the eighth embodiment.

FIG. 16A is a diagram explaining use nozzles in the eighth embodiment. FIG. 16B is a diagram explaining a printing method in the eighth embodiment. For simplicity of the explanation in the drawings, similarly to the case of FIGS. 4A and 4B, the number of the nozzles included in one nozzle row is decreased to 14. Moreover, the width length in the transporting direction of the background image and the main image is 42D, and the background image and the main image each can be formed by three-time passes. Here, the printing method of the white use mode and the front-surface printing mode is described.

First, passes 1 to 3, all nozzles #1 to #14 (Δ) of the white nozzle row W are the use nozzles for printing the background image. In addition, all nozzles of the color nozzle row Co are nonuse nozzles. Moreover, a one-time medium transporting amount is the length 14D of the nozzle row. Thereby, in passes 1 to 3, the background image having 42D in the width length in the transporting direction is printed.

Next, the medium is transported in the direction opposite to the transporting direction (reverse transporting). FIGS. 16A and 16B show that the nozzle rows move, but actually, the medium moves.

In passes 4 to 6 after the reverse transporting, all nozzles #1 to #14 (●) of the color nozzle row Co become use nozzles for printing the main image. In addition, all nozzles #1 to #14 (Δ) of the white nozzle row W are nonuse nozzles. Moreover, a one-time medium transporting amount is the length 14D of the nozzle row. Thereby, in passes 4 to 6, the main image is printed so as to be overlapped on the background image.

In eighth embodiment, similar to the first embodiment, when the controller 10 receives the printing data of the white use mode (S001→Y in FIG. 7A), the controller is set so as not to perform the shortest printing control (S002 in FIG. 7A). Thereby, the distance in which the head 41 moves after printing the lower layer image (background image in FIG. 16B) until printing the upper layer image (main image in FIG. 16B) is longer, and the time interval in which the lower layer image and the upper layer image are printed so as to be overlapped can be longer. As a result, bleeding or color mixture of the image can be prevented, and deterioration in quality of the image can be suppressed.

Moreover, in the eighth embodiment, similar to the first embodiment, when controller 10 receives the printing data of the color mode (S001→N in FIG. 7A), the controller 10 is set so as to perform the shortest printing control (S003 in FIG. 7A). In the case of the color mode, since only the main image is printed, a problem of bleeding or color mixture of the image is not generated. Therefore, the printing time can be shortened without deteriorating quality of the image by performing the shortest printing control.

Ninth Embodiment

FIG. 17 is an explanation diagram of a ninth embodiment. To facilitate understanding, in the drawing, the ninth embodiment will be described while comparing with the eighth embodiment.

In the ninth embodiment, in the case of the white use mode, similarly to the case of the eighth embodiment (FIGS. 16A and 16B), in each printing pass, the lower layer image is printed in advance by using one of the color nozzle row Co or the white nozzle row W, and thereafter, the upper layer image is printed on the lower layer image by using the other nozzle row. Moreover, in the ninth embodiment, the shortest printing control is performed even in the case of the white use mode.

In the case of the white mode and the front-surface printing mode, the main image is printed so as to be overlapped on the background image (refer to the white use mode and the front-surface printing mode of FIG. 3). Since the surface of the background image which is printed by white ink is uneven, quality of the main image printed on the background image is easily deteriorated. In addition, since the medium S previously absorbs the white ink before the printing of the main image, the main image is bled and color-mixed, and therefore, quality of the main image is easily deteriorated.

On the other hand, in the case of the white use mode and the rear-surface printing mode, the main image is printed on the surface of the medium S (refer to the white use mode and the rear-surface printing mode of FIG. 3). Since the printing surface of the medium S is relatively smooth, quality of the main image printed on the printing surface of the medium S is not easily deteriorated compared to the main image of the case of the white use mode and the front-surface printing mode. In addition, since inks of four colors are easily absorbed on the printing surface of the medium S, quality of the main image is difficult to be deteriorated compared to the main image of the case of the white use mode and the front-surface printing mode.

Thus, in the ninth embodiment, when the controller 10 receives the printing data of the white use mode and the front-surface printing mode, the controller 10 is set so as not to perform the shortest printing control. Thereby, the distance in which the head 41 moves after printing the background image until printing the main image is longer, and the time interval in which the background image and the main image are printed so as to be overlapped can be longer. As a result, bleeding or color mixture of the main image can be prevented, and deterioration in quality of the image can be suppressed.

On the other hand, when the controller 10 receives the printing data of the white use mode and the rear-surface printing mode, the controller 10 is set so as to perform the shortest printing control at the time of printing the main image which is the lower layer image, and the controller 10 is set so as not to perform the shortest printing control at the time of printing the background image which is the upper layer image. Thereby, the printing time can be further shortened compared to the eighth embodiment without deteriorating quality of the main image.

Tenth Embodiment

In the above-described printing methods, since the band printing in which the band image is formed by a single pass is performed, the nozzle interval in the transporting direction and the interval of the dot row in the transporting direction are the same interval D. A tenth embodiment adopts the interlace printing method in which other dot rows are formed between the dot rows which are formed in a certain printing pass. In the interlace printing method, the nozzle interval in the transporting direction becomes an integral multiple of the dot row in the transporting direction. In the tenth embodiment described below, the nozzle interval (1/180 inch) in the transporting direction becomes double the interval (1/360 inch) of the dot row in the transporting direction.

FIG. 18A is an explanation diagram of use nozzles in a printing method of the tenth embodiment.

In the tenth embodiment, since the interval D of the dot row is 1/360 inch, the denotation of the nozzle is different to those of the above-described embodiments. However, the disposition of the nozzle in the tenth embodiment is the same as those of the above-described embodiments. That is, also in the tenth embodiment, the nozzles of the color nozzle row Co are aligned by 1/180 inch (180 dpi) in the transporting direction, and the nozzles of the white nozzle row W are aligned by 1/180 inch (180 dpi) in the transporting direction. The nozzle interval in the transporting direction is denoted as 2D (D is the interval of the dot row in the transporting direction). However, the nozzle interval is 1/180 inch similar to the above-described embodiments.

Even in the tenth embodiment, in the printing method of the white use mode and the front-surface printing mode, the nozzles #8 to #14 (Δ) of the upstream side half in the transporting direction of the white nozzle row W are use nozzles for printing the background image, and the nozzles #1 to #7 (●) of the downstream side half in the transporting direction of the color nozzle row Co are use nozzles for printing the main image. Also, in the tenth embodiment, in the printing method of the white printing use mode and the rear-surface printing mode, the nozzles #8 to #14 (●) of the upstream side half in the transporting direction of the white nozzle row W are use nozzles for printing the background image, and the nozzles #1 to #7 (Δ) of the downstream side half in the transporting direction of the color nozzle row Co are use nozzles for printing the main image.

Figure 18B:
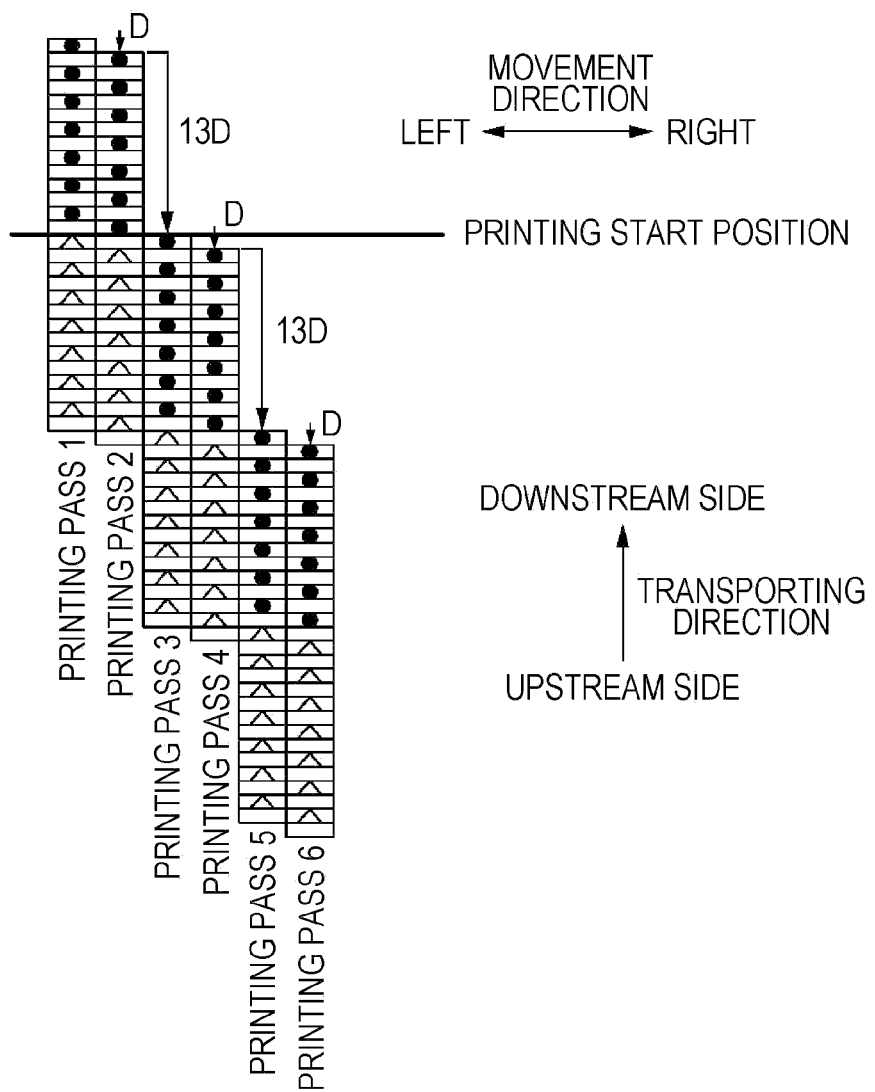
FIG. 18B is an explanation diagram of a printing method of the tenth embodiment.

FIG. 18B is an explanation diagram of the printing method of the tenth embodiment. Here, the printing method of the white use mode and the front-surface printing mode is described, and the description of the printing method of the rear-surface printing mode is omitted.

In the tenth embodiment, each nozzle row forms the dot row by the interval of 2D (=1/180 inch) in odd-numbered printing passes. After the odd-numbered printing passes, the medium is transported by D (=1/360 inch), and the next even-numbered printing passes are performed. In the even-numbered printing passes, each nozzle row forms the dot row by the interval of 2D (=1/180 inch) so that the dot rows are formed between the dot rows which are formed at the odd-numbered printing passes. By performing two printing passes, the band image is formed. That is, the band image is formed by a plurality of (two-time) printing passes in the tenth embodiment while the band image is formed by one-time printing pass in FIG. 4A described above. Moreover, after the band image is formed by two printing passes, the medium is transported at 13D. Thereafter, similarly, the printing passes (odd-numbered printing passes and even-numbered printing passes) and the transporting (the transporting in which the transporting amount is D and the transporting in which the transporting amount is 13D) are repeated.

Figure 19:
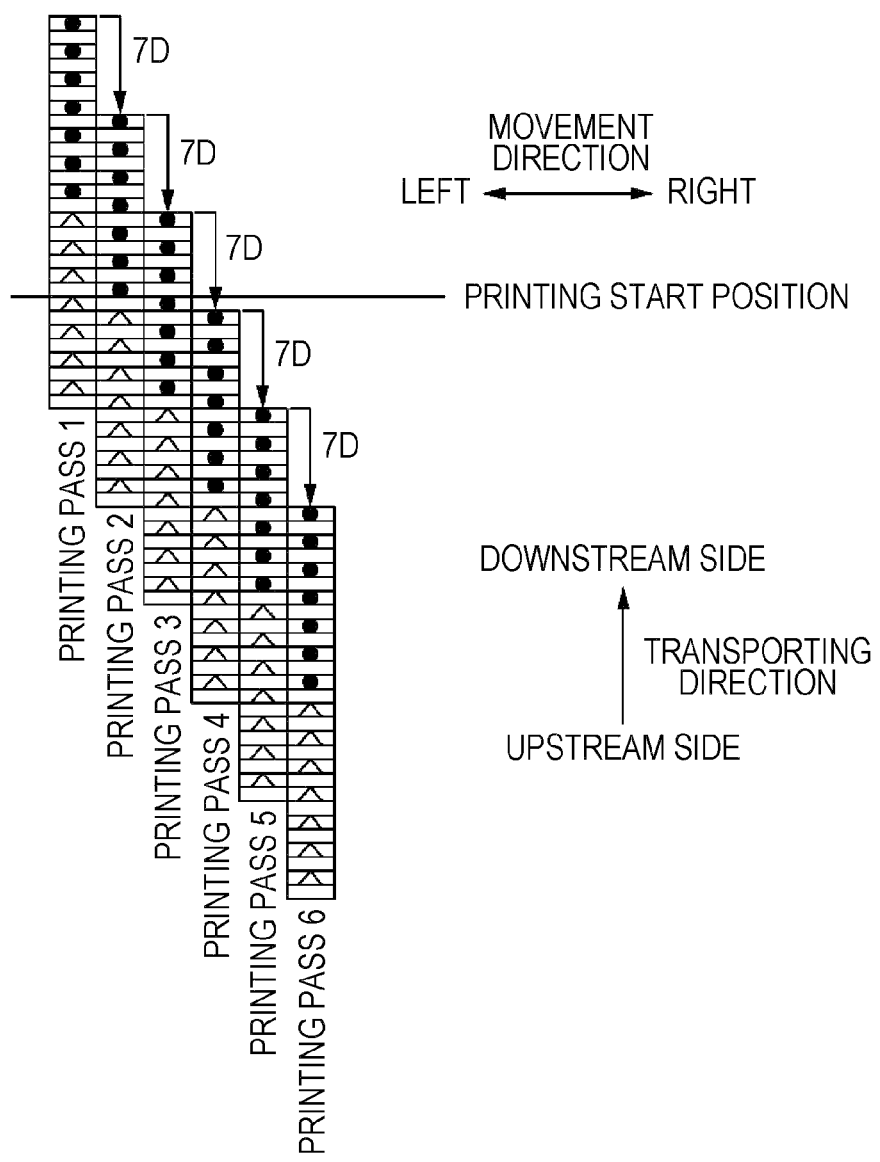
FIG. 19 is an explanation diagram of other printing method of the tenth embodiment.

FIG. 19 is an explanation diagram of another printing method of the tenth embodiment. Here, also, the printing method of the white use mode and the front-surface printing mode is described, and the description with respect to the printing method of the rear-surface printing mode is omitted.

In the printing method, the medium is transported by 7D in the transporting amount for each ending of the printing pass. In this way, since the medium is transported by a constant amount, the dot rows of other printing passes can be formed between the dot rows which are formed at a certain printing pass.

In addition, even in the case of adopting the printing method of the tenth embodiment, similarly to the first embodiment, when the controller 10 receives the printing data of the white mode (S001→Y in FIG. 7A), the controller 10 is set so as not to perform the shortest printing control (FIG. 7A: S002). Thereby, the distance in which the head 41 moves after printing the lower layer image (background image in FIG. 16B) until printing the upper layer image (main image in FIG. 16B) becomes longer, and the time interval in which the lower layer image and the upper layer image are printed so as to be overlapped can be longer. As a result, bleeding or color mixture of the image can be prevented, and deterioration in quality of the image can be suppressed.

Moreover, even in the case of adopting the printing method of the tenth embodiment, similar to the first embodiment, when controller 10 receives the printing data of the color mode (S001→N in FIG. 7A), the controller 10 is set so as to perform the shortest printing control (S003 in FIG. 7A). In the case of the color mode, since only the main image is printed, a problem of bleeding or color mixture of the image is not generated. Therefore, the printing time can be shortened without deteriorating quality of the image by performing the shortest printing control.

Eleventh Embodiment

In the above-described embodiments, if the controller 10 is set so as not to perform the shortest printing control, the shortest printing control is not performed at all the printing passes. However, as described below, the printing pass which performs the shortest printing control and the printing pass which does not perform the shortest printing control may be mixed.

Figure 20:
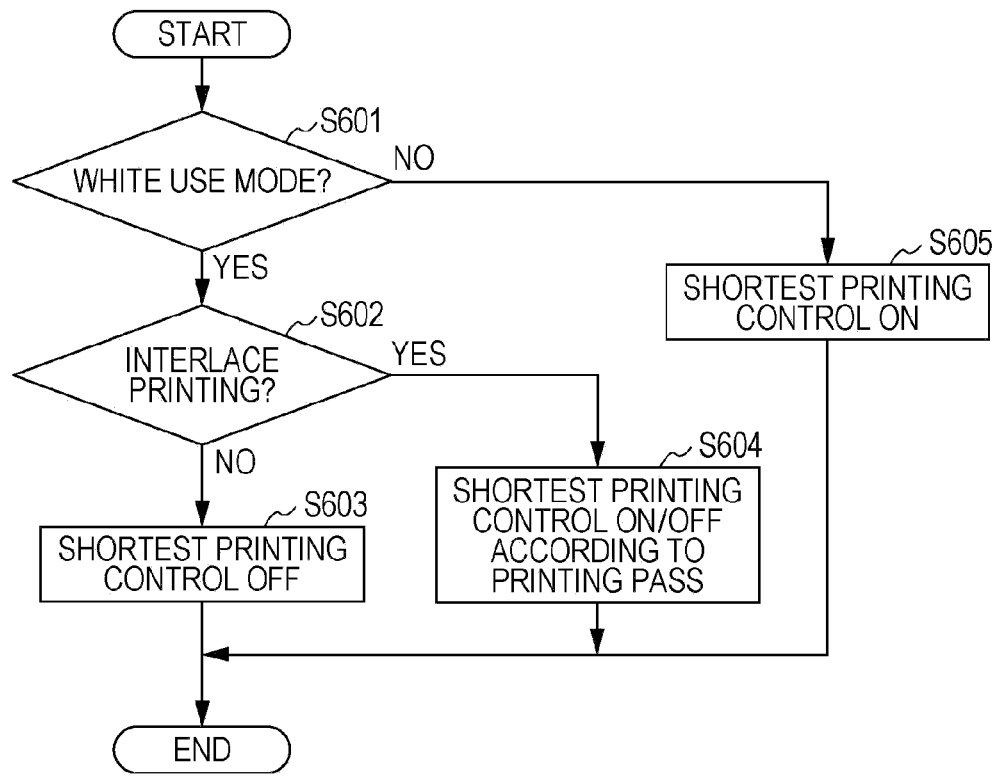
FIG. 20 is a setting flowchart of a printing method in an eleventh embodiment.

FIG. 20 is a setting flowchart of a printing method in an eleventh embodiment. The differences between the first embodiment (FIG. 7A) and the eleventh embodiment are that the processes of S602 and S604 are added to the eleventh embodiment.

When the controller 10 receives the printing data of the white use mode (S610→Y), the controller 10 determines whether or not the printing method indicated by the printing data is the interlace printing (S602). When the printing method indicated by the printing data is the band printing (S602→N), similarly to the S002 of the first embodiment, the controller 10 is set so as not to perform the shortest printing control (S603).

On the other hand, when the printing method indicated by the printing data is the interlace printing (S602→Y), the controller 10 sets the shortest printing control to ON or OFF according to the printing pass (S604). That is, in this case, although the printing method is the printing method of the white use mode, the printing pass which performs the shortest printing control is present.

For example, in the case of the interlace printing of the white use mode and the front-surface printing mode as shown in FIG. 18B, after the region on which the background image is formed through the printing pass 1 is subject to the printing pass 2, the main image is printed through a printing pass 3 or a printing pass 4. In this way, in the case of the printing method of the white use mode and the front-surface printing mode of FIG. 18B of the tenth embodiment, after the region on which the background image is printed at the odd-numbered printing pass is subject to the even-numbered printing pass, the main image is printed. As a result, the time interval until the main image overlaps on the white ink ejected at the odd-numbered printing pass is relatively longer than the time interval until the main image overlaps on the white ink ejected at the even-numbered printing pass.

Therefore, in the case of the interlace printing of the white use mode and the front-surface printing mode shown in FIG. 18B (S601→Y and S602→Y), the controller 10 is set so as to perform the shortest printing control with respect to the odd-numbered printing pass and not to perform the shortest printing control with respect to the even-numbered printing pass (S604).

Moreover, for example, in the case of the interlace printing of the white use mode and the front-surface printing mode shown in FIG. 19, after the region in which the background image is formed through the printing pass 1 is subjected to the printing pass 2, the main image is printed through the printing pass 3 or the printing pass 4. Thereby, the time interval until the main image overlaps on the white ink ejected at the printing pass 1 is relatively longer than the time interval until the main image overlaps on the white ink ejected at the printing pass 2.

However, in the case of the interlace printing of FIG. 19 unlike the case of the interlace printing of FIG. 18B, it is not preferable to perform the shortest printing control at the printing pass after the printing pass 2. The reason is because, in the printing pass after the printing pass 2, the main image is printed at the next printing pass on the region in which the background image is formed by nozzles #8 to #10 of the downstream side half in the transporting direction in the nozzle #8 to #14 (Δ) ejecting the white ink.

Therefore, in the case of the interlace printing of the white use mode and the front-surface printing mode shown in FIG. 19 (S601→Y and S602→Y), the controller 10 performs setting so as to perform the shortest printing control with respect to the printing pass 1 and not to perform the shortest printing control with respect to the other printing passes (S604).

In this way, in the eleventh embodiment, the shortest printing control is performed according to the printing pass even in the case of the white use mode (S601→Y). Particularly, in the case of the interlace printing (S602→Y), since the main image is not printed to be overlapped at the next printing pass on the region on which the background image is printed through a certain printing pass, the shortest printing control can be performed by the printing pass. As a result, quality of the image is not deteriorated even in the case of the white use mode, and the printing time can be shortened as the printing pass which performs the shortest printing control.

In addition, in the eleventh embodiment, when the controller 10 receives the printing data of the color mode (S601→N), the controller 10 is set so as to perform the shortest printing control (S605). Even though the shortest printing control is performed and the time interval in which the head 41 passes through a certain point on the medium is shorter, only the main image is printed on a certain point on the medium in the case of the color mode. Therefore, a problem of bleeding or color mixture of the image is not generated. That is, the printing time can be shortened without deteriorating quality of the image by performing the shortest printing control in the case of the color mode. This is similar to the first embodiment.

Other Embodiments

In the above-described embodiments, the fluid ejecting apparatus is mainly described. However, the invention also includes a fluid ejecting method. In addition, the above-described embodiments are described to facilitate understanding of the invention. Therefore, the embodiments should not be interpreted to limit the invention. The invention can be modified and improved without departing the gist of the invention, and it goes without saying that the invention includes the equivalents. Particularly, the following embodiments also are included in the invention.

Control Portion In the above-described embodiments, when the controller 10 included in the printer 1 receives the printing data of the white use mode, the controller is set so as to perform the shortest printing control. Therefore, the controller 10 corresponds to the control portion, and the printer 1 alone corresponds to the fluid ejecting apparatus. However, the invention is not limited to this. That is, when a printer driver (program) which is installed on the computer 60 connected to the printer 1 prepares the printing data of the white use mode by using a hardware resource of the computer 60, the printing data may be set to be printed without performing the shortest printing control. In this case, the computer 60 which installs the printer driver and the controller of the printer 1 correspond to the control portion, and the printing system which is connected to the printer 1 and the computer 60 corresponds to the fluid ejecting apparatus.

Background Image

In the above-described embodiments, the background image is printed by the white ink. However, the invention is not limited to this. That is, the background image may be printed by color ink (for example, a metallic based ink) other than the white ink.

In addition, if the background image is printed by using only the white ink, the color itself of the white ink printing the background image becomes the color of the background image. Similarly, hues of the white are different according to material or the like of the ink even in ink referred to as the white ink. In some cases, the background image having some chromatic color rather than simple white is needed. Thereby, a small amount of other color inks (YMCK) are appropriately used along with the white ink, a desired white background image may be printed. In this case, for example, the nozzles (#8 to #14) of the upstream side half in the transporting direction of the color nozzle row Co in the head 41 shown in FIG. 4A become use nozzles for printing the background image. In addition, when the white ink has some hue, conversely, due to the fact that the background image is printed by the white color and the color ink, the hue can be erased.

Nozzle Row Configuration

In the above-described embodiments (for example, refer to FIGS. 2A and 2B), in single head 41, the nozzle rows of four colors (YMCK) for printing the main image and the white nozzle row W for printing the background image are aligned in the movement direction of the head 41. However, the invention is not limited to this. For example, the nozzle rows of four colors (YMCK) and the white nozzle row (W) may be deviated in the nozzle direction. For achieving both of the front-surface printing mode and the rear-surface printing mode, the white nozzles (W) may be provided at both end sides in the nozzle row direction with respect to the nozzle rows of four colors. Moreover, the nozzle rows of four colors (YMCK) and the white nozzle (W) may be provided to other head 41.

White

In addition, the white is used as the background image in the above-described embodiments. However, the "white" of the invention is not limited to the white of a strict meaning which is the surface color of a material reflecting 100% of all wavelengths of visible rays. That is, the "white" of the invention includes those commonly referred to as "white" such as a so-called "whitish color". For example, the "white" may include the following. (1) color which is within the hue range in which the marking in a color space of L*a*b* is a circumference of 20 in the radius and the inner side on a*b* plane and L* value is 70 or more in the case of performing color-measuring with conditions of colorimetry mode: spot colorimetry, light source: D50, backing: black, and printing medium: transparent film, by using EYE-ONEPRO which is a colorimeter made by X-RITE Co., Ltd.; (2) color which is within the hue range in which the marking in a color space of L*a*b is a circumference of 20 in the radius and the inner side on a*b* plane and L* value is 70 or more in the case of performing color-measuring with conditions of colorimeter mode D502 visual field, SCF mode, and a white background, by using CM2022 which is a colorimeter made by MINOLTA Co., Ltd.; and (3) color of the ink which is used as the image background described in JP-A-2004-306591. In addition, the "white" is not limited to pure white if can be used as the background.

Ink and Medium

In the above-described embodiments, ink and the medium having an ink absorbability which absorbs the ink are used. The ink may be ink which is absorbed in the absorptive medium. Moreover, in order to secure the absorbability of the ink absorptive medium, it is preferable that the ink includes evaporative solvent. In addition, it is particularly preferable that the ink is a water-based ink which includes water as the solvent. As other components included in ink, there is dye or pigment as color material. In addition, for injection stability from the ink jet head, the ink may contain water-soluble organic solvent, and a moisturizing agent, a penetration enhancing agent, a pH control agent, an insect repellent, an ultraviolet absorbing agent, or the like if necessary. For example, as the color ink, inks described in JP-A-2008-81693, JP-A-2005-105135, and JP-A-2003-292834 may be used.

In addition, the white ink may contain white pigment such as a hollow resin or titanium oxide as the color material, and components other than the color material may be the same as those of the color ink. For example, as the white ink, inks described in JP-A-2009-138078 and JP-A-2009-137124 may be used.

The medium fixes the color material of ink composition by absorbing the solvent of the ink composition. For example, the medium may be a medium such as paper or cloth which uses a substrate absorbing ink and the medium may include ink absorptive substrate or an ink absorptive. In the case of using the transparent medium, for example, mediums described in JP-A-2009-925, JP-A-9-99634, and JP-A-9-208870 may be used.

If the ink and medium are used in the present embodiment, as the above-described embodiments, since the time interval in which the background image and the main image are printed so as to be overlapped is longer, drying time of the ink can be longer, and bleeding or color mixture of the image can be prevented. However, the ink or the medium used in the embodiment is not limited to those described above, and may be any one if components in the ink provide the time which needs to be fixed to the medium.

Printer

The above-described printer shown in FIGS. 2A and 2B includes the transporting unit which rotates the transporting roller directly contacting the medium and transports the medium. However, the invention is not limited to the printer.

Figure 21:
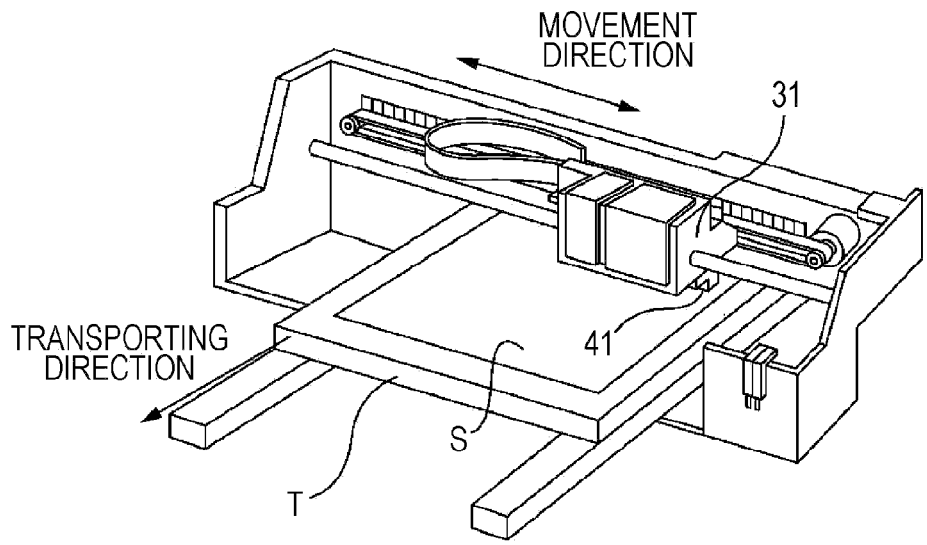
FIG. 21 is an explanation diagram of a flat bed type printer.

FIG. 21 is an explanation diagram of a flat bed type printer. In the printer, the medium S is adsorbed to a table T, the medium is not directly transported by a transporting unit, and the medium S is transported in the transporting direction due to the fact that the transporting unit moves the table T. Moreover, the printer repeats operation which prints an image on the medium S while moving the head 41 in the movement direction and operation which transports the medium S in the transporting direction with respect to the head 41 by moving the table T. The above-described embodiments may be realized through the flat type bed printer.

Figure 22A:
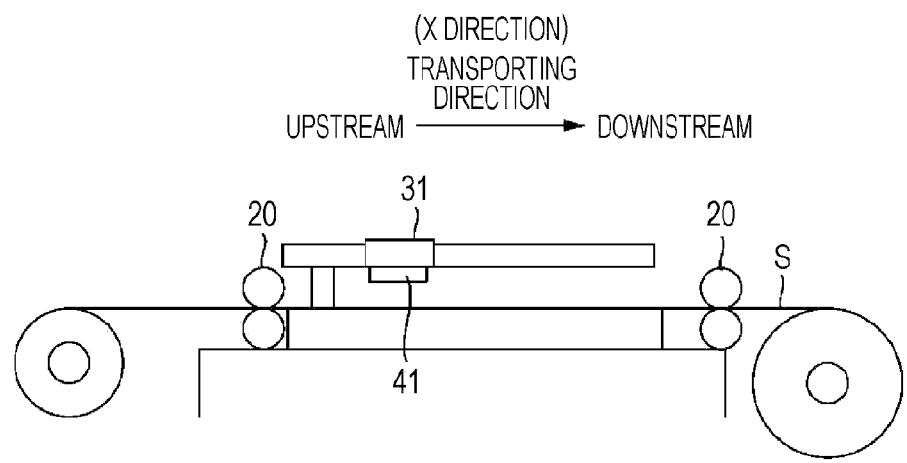
FIG. 22A is an explanation diagram of another type of printer.
Figure 22B:
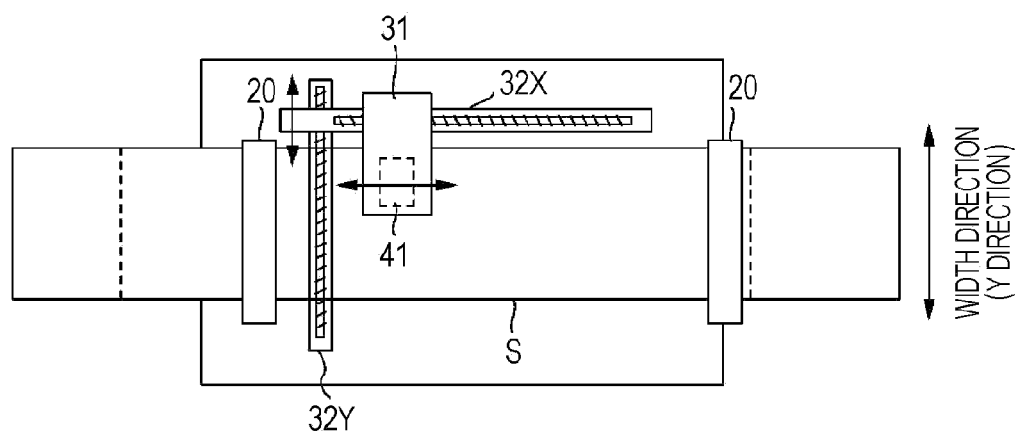
FIG. 22B is an explanation diagram of another type of printer.

FIGS. 22A and 22B are explanation diagrams of other types of printer. In the printer, the transporting unit of the printer transports a roll-shaped medium S in an X-direction (transporting direction). In addition, a carriage unit of the printer includes an X-table 32X for moving a carriage 31 which mounts a head 41 in the X-direction and a Y-table 32Y for moving the X-table 32 in a Y-direction (width direction of the medium). Thereby, the head 41 can move in a two-dimensional direction with respect to the medium. The printer 1 repeats an operation which prints an image while moving the head in the X-direction (the transporting direction of the medium and the direction to which the roll-shaped medium is extended) and an operation which moves the head in the Y-direction (width direction of the medium), and prints the image on the printing region. In addition, the printer transports the medium in the transporting direction after printing the image on the printing region. Therefore, the portion on which the image is not printed is transported to the printing region. The above-described embodiments may be realized through the other type printer.

Moreover, the tables shown in FIG. 21 may be used in the transporting of the printer of FIGS. 22A and 22B in which the head two-dimensionally moves.

Fluid Ejecting Apparatus

The above-described embodiments exemplify the ink jet printer as the fluid apparatus. However, the invention is not limited to this. That is, the invention may be applied to not only the printer (printing apparatus) to but also various industrial apparatuses if the apparatus is a fluid ejecting apparatus. For example, the invention may be applied to a textile printing apparatus for fixing patterns on cloth, a display manufacturing apparatus such as a color filter manufacturing apparatus or an organic electro luminescence display, a DNA tip manufacturing which coats a solution dissolving DNA on a tip and manufactures the DNA tip, or the like.

In addition, the method for ejecting the fluid from the nozzles may adopt a piezo method which ejects the fluid by applying voltage to the driving element (piezo element) and expanding and contracting a pressure chamber and a thermal method which generates vapor in nozzles by using heater element and ejects the fluid by the vapor.

The ink ejected from the head 41 may be ultraviolet ray curable inks which are cured through an ultraviolet ray irradiation.

What is claimed is:

1. A fluid ejecting apparatus comprising:
a first nozzle row in which nozzles ejecting a first fluid are aligned in a predetermined direction;
a second nozzle row in which nozzles ejecting a second fluid are aligned in the predetermined direction; and
a control portion that causes repeatedly performing of an ejecting operation which ejects the fluid from the nozzles while the first nozzle row and the second nozzle row move in a movement direction crossing the predetermined direction with respect to a medium, and a relative movement operation which relatively moves the first nozzle row and the second nozzle row and the medium in the predetermined direction, in which the control portion causes repeatedly performing of the ejecting operation so as to include the ejecting operation which does not perform a control which changes the movement distance in the movement direction of the first nozzle row and the second nozzle row according to a position of an end in the movement direction of the image when a main image formed by the first fluid and a background image formed by the second fluid are formed so as to be overlapped on the medium at different ejecting operations.

2. The fluid ejecting apparatus according to claim 1, wherein the control portion performs a control which changes the movement distance in the movement direction of the first nozzle row and the second nozzle row in the movement direction according to a position of an end in the movement direction of the image when the main image is formed on the medium so as not to be overlapped with the background image.

3. The fluid ejecting apparatus according to claim 1, wherein when the main image and the background image are formed so as to be overlapped,
the control portion causes the fluid to be ejected from the nozzles when the first nozzle row and the second nozzle row move to the same side as the movement direction of the former ejecting operation in a case where a distance, which is from an end of an image of a side in which the first nozzle row and the second nozzle row are supposed to be moved in the movement direction to the end of the side which is supposed to be in the movement direction of the medium when forming an image to be formed in advance with respect to a predetermined region of the medium, is less than a threshold value, and
the control portion causes the fluid to be ejected when the first nozzle row and the second nozzle row move to the side opposite the movement direction of the former ejecting operation in a case where the distance is the threshold value or more.

4. The fluid ejecting apparatus according to claim 3, wherein when the main image and the background image are formed so as to be overlapped,
in a case where a distance, which is from an end of an one side in the movement direction of an image formed in advance with respect to a predetermined region of the medium to the end of the one side in the movement direction of the medium when performing a certain ejecting operation in which the first nozzle row and the second nozzle row move to the one side in the movement direction, is less than a threshold value, the control portion causes fluid to be ejected from the nozzles when the first nozzle row and the second nozzle row move to the one side in the movement direction at the time of the next ejection operation of a certain ejection operation, and
the control portion causes the fluid to be ejected from the nozzles when the first nozzle row and the second nozzle row move to other side in the movement direction at the time of the next ejection operation of a certain ejection operation in a case where the distance is the threshold value or more.

5. The fluid ejecting apparatus according to claim 3, wherein when the main image and the background image are formed so as to be overlapped,
in a case where a distance, which is from an end of an one side in the movement direction of a region overlapping an image formed later and an image formed in advance with respect to a predetermined region of the medium to the end of the one side in the movement direction of the medium when performing a certain ejecting operation in which the first nozzle row and the second nozzle row move to the one side in the movement direction, is less than a threshold value, the control portion causes fluid to be ejected from the nozzles when the first nozzle row and the second nozzle row move to the one side in the movement direction at the time of the next ejection operation of a certain ejection operation, and the control portion causes the fluid to be ejected from the nozzles when the first nozzle row and the second nozzle row move to other side in the movement direction at the time of the next ejection operation of a certain ejection operation in a case where the distance is the threshold value or more.

6. The fluid ejecting apparatus according to claim 1, wherein when the main image and the background image are formed so as to be overlapped, the control portion performs a control which causes the fluid to be ejected from the nozzles when the first nozzle row and the second nozzle row move both directions in the movement direction, and a time interval of the ejecting operation in a case where a distance, which is from an end of an image of a side to which the first nozzle row and the second nozzle row move in the movement direction to an end of a side to which the medium moves in the movement direction when forming an image to be formed in advance with respect to a predetermined region of the medium, is less than a predetermined value is longer than a time interval in a case where the distance is the threshold or more.

7. The fluid ejecting apparatus according to claim 1, wherein the control portion performs a control which causes the fluid to be ejected from the nozzles only when the first nozzle row and the second nozzle row move to one side in the movement direction when the main image and the background image are formed so as to be overlapped.

8. A fluid ejecting method comprising:

repeating performing an ejection operation which ejects the fluid from nozzles while moving a first nozzle row in which the nozzles ejecting a first fluid are aligned in a predetermined direction and a second nozzle row in which the nozzles ejecting a second fluid are aligned in the predetermined direction in a movement direction crossing the predetermined direction, and performing a relative movement operation in which the first nozzle row and the second nozzle row and the medium relatively move in the predetermined direction; and repeatedly performing the ejecting operation so as to include the ejecting operation which does not change the movement distance in the movement direction of the first nozzle row and the second nozzle row according to a position of an end in the movement direction of the image when a main image formed by the first fluid and a background image formed by the second fluid are formed so as to be overlapped on the medium at different ejecting operations;

wherein the above steps are executed by processor.

* * * * *